(12) United States Patent
Ewsuk

(10) Patent No.: US 10,544,058 B1
(45) Date of Patent: Jan. 28, 2020

(54) HIGH THERMAL EXPANSION GLASS COMPOSITES AND USES THEREOF

(71) Applicant: National Technology & Engineering Solutions of Sandia, LLC, Albuquerque, NM (US)

(72) Inventor: Kevin G. Ewsuk, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/993,889

(22) Filed: May 31, 2018

Related U.S. Application Data

(60) Provisional application No. 62/513,913, filed on Jun. 1, 2017.

(51) Int. Cl.
| | | |
|---|---|---|
| C03C 8/24 | (2006.01) |
| C03C 3/097 | (2006.01) |
| C03C 8/08 | (2006.01) |
| C03B 32/02 | (2006.01) |

(52) U.S. Cl.
CPC ............ *C03C 3/097* (2013.01); *C03B 32/02* (2013.01)

(58) Field of Classification Search
CPC .. C03C 8/08; C03C 8/24; C03C 3/097; C03C 10/0009
See application file for complete search history.

(56) References Cited

U.S. PATENT DOCUMENTS

| | | |
|---|---|---|
| 4,414,282 A | 11/1983 | McCollister et al. |
| 4,536,203 A | 8/1985 | Kramer |
| 4,705,585 A | 11/1987 | Kelly et al. |
| 4,921,738 A | 5/1990 | Cassidy |
| 5,104,738 A | 4/1992 | Brow et al. |
| 5,648,302 A | 7/1997 | Brow et al. |
| 5,693,580 A | 12/1997 | Brow et al. |
| 5,820,989 A | 10/1998 | Reed et al. |
| 6,034,011 A | 3/2000 | Yamaguchi et al. |
| 6,174,827 B1 | 1/2001 | Goto et al. |
| 6,395,368 B1 | 5/2002 | Yamaguchi et al. |
| 6,413,890 B1 | 7/2002 | Goto |
| 6,993,463 B1 | 1/2006 | Ewsuk et al. |
| 8,082,663 B1 | 12/2011 | Monroe et al. |
| 8,334,421 B1 | 12/2012 | Gao et al. |
| 8,593,237 B1 | 11/2013 | Dai |
| 8,772,566 B2 | 7/2014 | Gao et al. |
| 9,878,944 B1 | 1/2018 | Dai et al. |
| 10,059,625 B2 * | 8/2018 | Dai .................. C03C 27/02 |

OTHER PUBLICATIONS

U.S. Appl. No. 15/340,797, filed Nov. 1, 2016, Dai.
U.S. Appl. No. 15/701,893, filed Sep. 12, 2017, Dai et al.
Bauleke MP et al., "How to solve the problems of body cracking and glaze popping in stoneware bodies," *Kansas Geological Survey* Apr. 1978; bulletin 211(part 4):23-7.
Bengisu M et al., "Interfacial reactions between lithium silicate glass-ceramics and Ni-based superalloys and the effect of heat treatment at elevated temperatures," *J. Mater. Sci.* 2004;39:605-18.
Criscenti LJ et al., "Tailored property and processing particle-filled-glass composite design and development," proposed for presentation at the 12th Pacific Rim Conference on Ceramic and Glass Technology, held May 21-26, 2017 in Waikoloa, HI, *Sandia Report No. SAND2017-52201C* (28 pp.).
DiAntonio CB et al., "Characterization and control of Low Temperature Co-fire Ceramic (LTCC) sintering," proposed for presentation at the Ceramic Interconnect Technology: The Next Generation held Apr. 8-9, 2003 in Denver, CO, *SAND Report No. SAND2003-0781C* (5 pp.).
Donald IW et al., "Interfacial reactions in glass-ceramic-to-metal seals," *J. Am. Ceram. Soc.* 2008;91(3):715-20.
Donald IW, "Preparation, properties and chemistry of glass- and glass-ceramic-to-metal seals and coatings," *J. Mater. Sci.* 1993;28:2841-86.
Eppler RA, "Glass formation and recrystallization in the lithium metasilicate region of the system $Li_2O$—$Al_2O_3$—$SiO_2$," *J. Am. Ceram. Soc.* 1963;46(2):97-101.
Ewsuk KG et al., "Densification of glass-filled alumina composites," *Ceramic Transactions*, vol. 7, "*Sintering of Advanced Ceramics*," (CA Handwerker, JE Blendell, W Kaysser, eds.), The American Ceramic Society, Inc., (Westerville, OH), 1990, pp. 436-451.
Ewsuk KG et al., "Manufacturing tailored property ceramic composites," *SAND Report No. SAND93-1875C* (24 pp.).
Ewsuk KG et al., "Sintering glass-filled ceramic composites; effects of glass properties," *Ceramic Transactions*, vol. 1, "*Ceramic Powder Science II*," (GL Messing, ER Fuller, H Hausner, eds.), The American Ceramic Society, Inc. (Westerville, OH), 1988, pp. 969-977.
Ewsuk KG et al., "Sintering maps for ceramic-filled-glass composites," presentation at the 2nd Int'l. Ceramic Congress held on Nov. 11-15, 1990 in Orlando, FL, *Sandia Report No. SAND90-1675C* (12 pp.).
Fluegel A, "Thermal expansion calculation for silicate glasses at 210°C based on a systematic analysis of global databases," *Glass Technology—Eur. J. Glass Sci. Technol. A* 2010;51(5):1191-201.
Hammetter WF et al., "Crystallization kinetics of a complex lithium silicate glass-ceramic," *J. Am. Ceram. Soc.* 1987;70(8):577-82.
Headley TJ et al., "Crystallization of a glass-ceramic by epitaxial growth," *J. Am. Ceram. Soc.* 1984;67(9):620-5.
Henderson WR et al., "Determination of the optimum crystallization conditions of a high thermal expansion glass-ceramic," MOUND Report No. MLM-3136, Monsanto Research Corp., 1984, pp. 1-11.

(Continued)

*Primary Examiner* — Karl E Group
(74) *Attorney, Agent, or Firm* — Helen S. Baca

(57) ABSTRACT

The present invention relates to glass composites, including filled glass composites and uses thereof. In particular examples, the composites provide improved thermal expansion characteristics. Also described are methods of forming such composites, such as by adding a particle filler to a glass mixture.

7 Claims, 10 Drawing Sheets

(56) References Cited

OTHER PUBLICATIONS

Hummel FA, "Thermal expansion properties of some synthetic lithia minerals," *J. Am. Ceram. Soc.* 1951;34:235-9.

Knorovsky GA et al., "Interfacial debonding in stainless steel/glass ceramic seals," *Sandia Report No. SAND89-1866C*, Albuquerque: Sandia National Laboratories, Apr. 1991 (10 pp.).

Kunz SC et al., "Thermal expansion mismatch produced by interfacial reactions in glass-ceramic to metal seals," *Adv. Ceram. Mater.* 1987;2(1):69-73.

Loehman RE et al., "Design of high thermal expansion glass-ceramics through microstructural control," in *Ceramic Microstructures '86 (Materials Sciences Research vol. 21)*, eds. J.A. Pask and A.G. Evans, New York and London: Plenum Press, 1987, pp. 33-43.

Loehman RE, "Interfacial reaction in ceramic-metal systems," *Ceram. Bull.* 1989;68(4):891-6.

Loehman RE, "Processing and interfacial analysis of glass-ceramic to metal seals," in *Technology of glass, ceramic, or glass-ceramic to metal sealing* (eds. WE Moddeman, CW Merten, and DP Kramer), American Society of Mechanical Engineers:1987, vol. 4, pp. 39-46.

Susan DF et al., "Surface alloy depletion and martensite formation during glass to metal joining of austenitic stainless steels," *Sci. Technol. Welding Joining* 2012;17(4):321-32.

Susan DF et al., "The effects of pre-oxidation and alloy chemistry of austenitic stainless steels on glass/metal sealing," *Oxid. Metals* 2010;73(10):311-35.

Watkins RD et al., "Interfacial reaction between a complex lithium silicate glass-ceramic to Iconel 718," *Adv. Ceram. Mater.* 1986;1(1):77-80.

\* cited by examiner

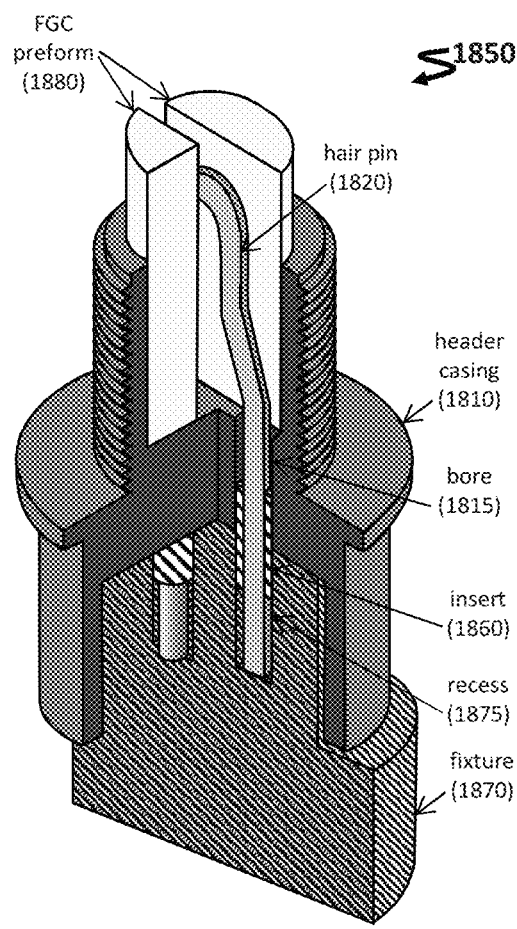
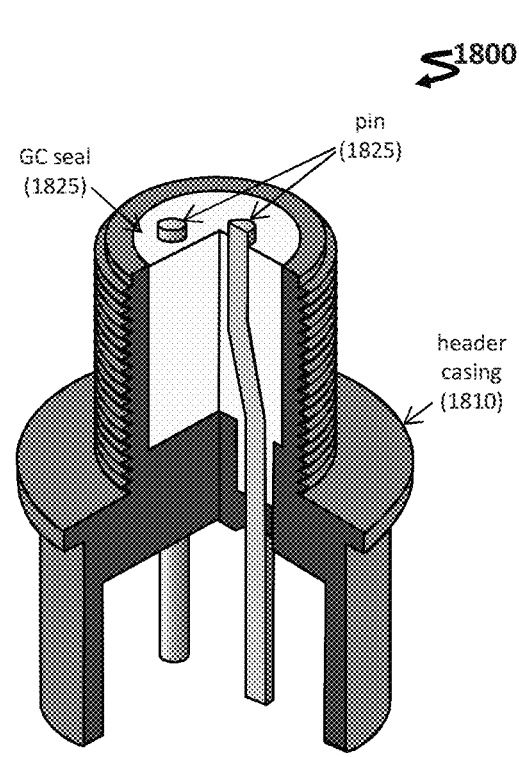
FIG. 15A                    FIG. 15B

US 10,544,058 B1

HIGH THERMAL EXPANSION GLASS COMPOSITES AND USES THEREOF

CROSS-REFERENCE TO RELATED APPLICATION

This application claims the benefit of U.S. Provisional Application No. 62/513,913, filed Jun. 1, 2017, which is hereby incorporated by reference in its entirety.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to glass composites, including filled glass composites and uses thereof. In particular examples, the composites provide improved thermal expansion characteristics. Also described are methods of forming such composites, such as by adding a particle filler to a glass mixture.

BACKGROUND OF THE INVENTION

Glass-ceramics (G-Cs) in glass-to-metal (GtM) seals have improved tolerance to cracking/chipping, but at the expense of robust manufacturability, and with unresolved hermeticity issues attributable to poor interface bonding. There is a need for advanced composites exhibiting a high coefficient of thermal expansion (CTE), while maintaining robust and simplified processing.

SUMMARY OF THE INVENTION

The present invention relates to filled glass composites (FGCs) and methods of forming such composites. In particular embodiments, the composite is a tunable, high thermal expansion sealing material that is produced through the addition of a crystalline filler (e.g., a crystalline quartz powder or any other filler describe herein) to a matrix (e.g., an amorphous, crystallizable lithium aluminosilicate glass or any other matrix described herein). In general, the presence of the filler within the matrix provides a material having a higher coefficient of thermal expansion (CTE), as compared to the matrix alone. By requiring a filler to be added to the matrix, the amount of the filler can be controlled. Further, physical and chemical properties of the composite (e.g., as measured by the CTE) can be tuned by the amount of added filler.

Another exemplary benefit includes simplified processing of the composite (e.g., to form a seal). For instance, specialized thermal processing may not be required to process the composite. Instead, a simplified thermal process can be performed, similar in manner to belt-processable S (BPS) glass. In some non-limiting embodiments, the result is a simpler, more manufacturable, and more robust process to produce a tunable, high thermal expansion sealing material with a more linear thermal strain tailored to the joining material for improved seal performance and reliability. Additional details follow.

Definitions

As used herein, the term "about" means +/−10% of any recited value. As used herein, this term modifies any recited value, range of values, or endpoints of one or more ranges.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

BRIEF DESCRIPTION OF THE DRAWINGS

FIG. 15A-15B shows schematics for an exemplary assembly 1850 to form an electrical header 1800 in a cut-away view having a fixture 1870 (FIG. 15A) and omitting the fixture (FIG. 15B).

DETAILED DESCRIPTION OF THE INVENTION

Figure 1:
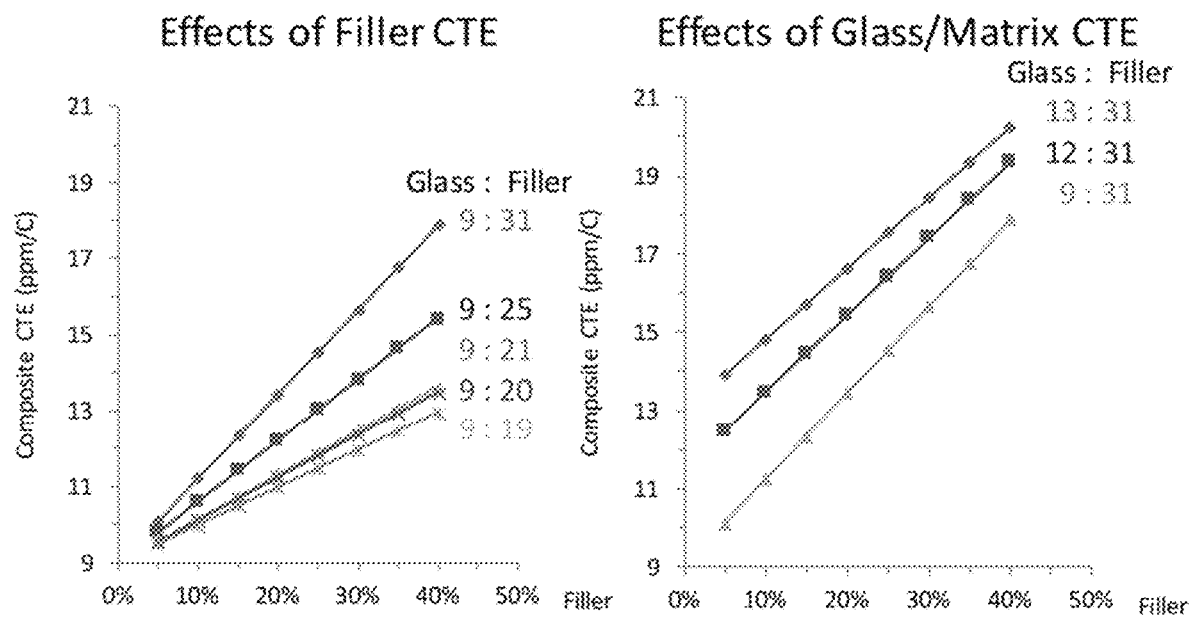
FIG. 1 shows graphs providing the predicted effects on the coefficient of temperature expansion (CTE) by changing the amount of either the filler or the matrix in a filled glass composite (FGC). Provided is a graph showing the effect of increasing the filler content while maintaining the matrix (glass) content on the predicted CTE (left) and another graph showing the effect of increasing the matrix (glass) content while maintaining the filler content on the predicted CTE (right).

The present invention relates to filled glass composites (FGCs), including particle-filled glass composites. Typically, such a composite can include a matrix and a filler. In some instances, the composite has enhanced structural characteristics and/or sealing capability, which combines the beneficial attributes of the matrix alone or the filler alone while avoiding their deficiencies.

As described herein, FGCs can be formed in any useful manner. In one non-limiting instance, the FGC is formed by providing the matrix and filler separately, and then adding the filler in any useful amount. By requiring a separate addition step, processing of the FGC can be simplified by minimizing the number of heating-cooling cycles.

The composite can have any useful crystalline phase. In some embodiments, the composition further includes of from about 2 wt. % to about 30 wt. % of $SiO_2$ as a high quartz phase (e.g., from 2 wt. % to 10 wt. %, 2 wt. % to 15 wt. %, 2 wt. % to 20 wt. %, 2 wt. % to 25 wt. %, 5 wt. % to 10 wt. %, 5 wt. % to 15 wt. %, 5 wt. % to 20 wt. %, 5 wt. % to 25 wt. %, 5 wt. % to 30 wt. %, 10 wt. % to 15 wt. %, 10 wt. % to 20 wt. %, 10 wt. % to 25 wt. %, 10 wt. % to 30 wt. %, 15 wt. % to 20 wt. %, 15 wt. % to 25 wt. %, 15 wt. % to 30 wt. %, 20 wt. % to 25 wt. %, 20 wt. % to 30 wt. %, and 25 wt. % to 30 wt. %). In other embodiments, the composition further includes of from about 2 wt. % to about 30 wt. % of $SiO_2$ as a tridymite phase (e.g., from 2 wt. % to 10 wt. %, 2 wt. % to 15 wt. %, 2 wt. % to 20 wt. %, 2 wt. % to 25 wt. %, 5 wt. % to 10 wt. %, 5 wt. % to 15 wt. %, 5 wt. % to 20 wt. %, 5 wt. % to 25 wt. %, 5 wt. % to 30 wt. %, 10 wt. % to 15 wt. %, 10 wt. % to 20 wt. %, 10 wt. % to 25 wt. %, 10 wt. % to 30 wt. %, 15 wt. % to 20 wt. %, 15 wt. % to 25 wt. %, 15 wt. % to 30 wt. %, 20 wt. % to 25 wt. %, 20 wt. % to 30 wt. %, and 25 wt. % to 30 wt. %).

In any embodiment herein, the composition further includes of from about 5 wt. % to about 40 wt. % of $SiO_2$ as a cristobalite phase (e.g., from 5 wt. % to 10 wt. %, 5 wt. % to 15 wt. %, 5 wt. % to 20 wt. %, 5 wt. % to 25 wt. %, 5 wt. % to 30 wt. %, 5 wt. % to 35 wt. %, 5 wt. % to 40 wt. %, 10 wt. % to 15 wt. %, 10 wt. % to 20 wt. %, 10 wt. % to 25 wt. %, 10 wt. % to 30 wt. %, 10 wt. % to 35 wt. %, 10 wt. % to 40 wt. %, 15 wt. % to 20 wt. %, 15 wt. % to 25 wt. %, 15 wt. % to 30 wt. %, 15 wt. % to 35 wt. %, 15 wt. % to 40 wt. %, 20 wt. % to 25 wt. %, 20 wt. % to 30 wt. %, 20 wt. % to 35 wt. %, 20 wt. % to 40 wt. %, 25 wt. % to 30 wt. %, 25 wt. % to 35 wt. %, and 25 wt. % to 40 wt. %).

In any embodiment herein, the ratio, by weight, of the cristobalite phase to the quartz phase (e.g., in the composite) is of from about 1:0.5 to about 1:2 (e.g., from 1:0.6 to 1:2, 1:0.7 to 1:2, 1:0.8 to 1:2, 1:0.9 to 1:2, 1:1 to 1:2, 1:1.1 to 1:2, 1:1.2 to 1:2, 1:1.3 to 1:2, 1:1.4 to 1:2, 1:1.5 to 1:2, 1:1.6 to 1:2, 1:1.7 to 1:2, 1:1.8 to 1:2, or 1:1.9 to 1:2).

In any embodiment herein, the quartz phase includes α-quartz and/or β-quartz. In other embodiments, the cristobalite phase includes α-cristobalite and/or β-cristobalite.

In any embodiment herein, a combined weight percentage for both the cristobalite phase and the quartz phase (e.g., in the composite) is of from about 10 wt. % to about 50 wt. % (e.g., from 10 wt. % to 15 wt. %, 10 wt. % to 20 wt. %, 10 wt. % to 25 wt. %, 10 wt. % to 30 wt. %, 10 wt. % to 35 wt. %, 10 wt. % to 40 wt. %, 10 wt. % to 45 wt. %, 15 wt. % to 20 wt. %, 15 wt. % to 25 wt. %, 15 wt. % to 30 wt. %, 15 wt. % to 35 wt. %, 15 wt. % to 40 wt. %, 15 wt. % to 45 wt. %, 15 wt. % to 50 wt. %, 20 wt. % to 25 wt. %, 20 wt. % to 30 wt. %, 20 wt. % to 35 wt. %, 20 wt. % to 40 wt. %, 20 wt. % to 45 wt. %, 20 wt. % to 50 wt. %, 25 wt. % to 30 wt. %, 25 wt. % to 35 wt. %, 25 wt. % to 40 wt. %, 25 wt. % to 45 wt. %, 25 wt. % to 50 wt. %, 30 wt. % to 35 wt. %, 30 wt. % to 40 wt. %, 30 wt. % to 45 wt. %, 30 wt. % to 50 wt. %, 35 wt. % to 40 wt. %, 35 wt. % to 45 wt. %, 35 wt. % to 50 wt. %, 40 wt. % to 45 wt. %, 40 wt. % to 50 wt. %, and 45 wt. % to 50 wt. %).

In any embodiment herein, the composite further includes of from about 5 wt. % to about 30 wt. % of $SiO_2$ as an amorphous phase (e.g., from 5 wt. % to 10 wt. %, 5 wt. % to 15 wt. %, 5 wt. % to 20 wt. %, 5 wt. % to 25 wt. %, 10 wt. % to 15 wt. %, 10 wt. % to 20 wt. %, 10 wt. % to 25 wt. %, 10 wt. % to 30 wt. %, 15 wt. % to 20 wt. %, 15 wt. % to 25 wt. %, 15 wt. % to 30 wt. %, 20 wt. % to 25 wt. %, 20 wt. % to 30 wt. %, and 25 wt. % to 30 wt. %).

Methods herein can employ any useful number of cooling and/or heating steps. Temperatures $T_1$, $T_2$, $T_3$, and $T_4$ can be any useful temperature or temperature range. In some embodiments, temperature $T_1$ is of from about 900° C. to about 1500° C. (e.g., of from 900° C. to 1250° C., from 900° C. to 1200° C., from 900° C. to 1100° C., from 900° C. to 1050° C., from 900° C. to 1000° C., from 925° C. to 1500° C., from 925° C. to 1250° C., from 925° C. to 1200° C., from 925° C. to 1100° C., from 925° C. to 1050° C., from 925° C. to 1000° C., from 950° C. to 1500° C., from 950° C. to 1250° C., from 950° C. to 1200° C., from 950° C. to 1100° C., from 950° C. to 1050° C., from 950° C. to 1000° C., from 1000° C. to 1500° C., from 1000° C. to 1250° C., from 1000° C. to 1200° C., from 1000° C. to 1100° C., from 1000° C. to 1050° C., or from 1000° C. to 1000° C.).

In yet other embodiments, temperature $T_2$ is of from about 650° C. to about 950° C. (e.g., of from 650° C. to 900° C., from 650° C. to 850° C., from 650° C. to 800° C., from 650° C. to 750° C., from 650° C. to 700° C., from 700° C. to 950° C., from 700° C. to 900° C., from 700° C. to 850° C., from 700° C. to 800° C., from 700° C. to 750° C., from 750° C. to 950° C., from 750° C. to 900° C., from 750° C. to 850° C., from 750° C. to 800° C., from 775° C. to 950° C., from 775° C. to 900° C., from 775° C. to 850° C., from 775° C. to 800° C., from 800° C. to 950° C., from 800° C. to 900° C., from 800° C. to 850° C., from 825° C. to 950° C., from 825° C. to 900° C., from 825° C. to 850° C., from 850° C. to 950° C., from 850° C. to 900° C., from 875° C. to 950° C., or from 875° C. to 900° C.).

In some embodiments, temperature $T_3$ is of from about 5° C. to about 500° C. (e.g., of from 5° C. to 450° C., from 5° C. to 400° C., from 5° C. to 350° C., from 5° C. to 300° C., from 5° C. to 250° C., from 5° C. to 200° C., from 5° C. to 150° C., from 5° C. to 100° C., from 5° C. to 50° C., from 10° C. to 500° C., from 10° C. to 450° C., from 10° C. to 400° C., from 10° C. to 350° C., from 10° C. to 300° C., from 10° C. to 250° C., from 10° C. to 200° C., from 10° C. to 150° C., from 10° C. to 100° C., from 10° C. to 50° C., from 15° C. to 500° C., from 15° C. to 450° C., from 15° C. to 400° C., from 15° C. to 350° C., from 15° C. to 300° C., from 15° C. to 250° C., from 15° C. to 200° C., from 15° C. to 150° C., from 15° C. to 100° C., from 15° C. to 50° C., from 20° C. to 500° C., from 20° C. to 450° C., from 20° C. to 400° C., from 20° C. to 350° C., from 20° C. to 300° C., from 20° C. to 250° C., from 20° C. to 200° C., from 20° C. to 150° C., from 20° C. to 100° C., from 20° C. to 50° C., from 25° C. to 500° C., from 25° C. to 450° C., from 25° C.

to 400° C., from 25° C. to 350° C., from 25° C. to 300° C., from 25° C. to 250° C., from 25° C. to 200° C., from 25° C. to 150° C., from 25° C. to 100° C., or from 25° C. to 50° C.).

Methods herein can include providing a glass matrix. In some embodiments, the matrix includes raw materials configured to provide components of the composite. In some embodiments, the matrix includes of from about 40 wt. % to about 90 wt. % of $SiO_2$ (e.g., from 50 wt. % to 80 wt. %); from about 10 wt. % to about 45 wt. % of $Li_2CO_3$ (e.g., from 10 wt. % to 30 wt. %); from about 1 wt. % to about 10 wt. % of $Al_2O_3$ (e.g., from 1 wt. % to 5 wt. %); from about 0.5 wt. % to about 15 wt. % of $K_2CO_3$ (e.g., from 2 wt. % to 10 wt. %); from about 0.5 wt. % to about 10 wt. % of $Li_3PO_4$ (e.g., from 2 wt. % to 10 wt. %); from about 0.5 wt. % to about 15 wt. % of $H_3BO_3$ (e.g., from 1 wt. % to 5 wt. %); and from about 0.05 wt. % to about 6 wt. % of ZnO (e.g., from 1 wt. % to 5 wt. %).

Methods herein can also include providing a filler. In some embodiments, the providing step includes adding a particle filler in an amount of from about 10 wt. % to about 60 wt. % to the mixture, thereby forming a mixture. In further embodiments, the amount of the filler is of from about 5 wt. % to about 60 wt. % (e.g., from 5 wt. % to 10 wt. %, 5 wt. % to 15 wt. %, 5 wt. % to 20 wt. %, 5 wt. % to 25 wt. %, 5 wt. % to 30 wt. %, 5 wt. % to 35 wt. %, 5 wt. % to 40 wt. %, 5 wt. % to 50 wt. %, 5 wt. % to 60 wt. %, 10 wt. % to 15 wt. %, 10 wt. % to 20 wt. %, 10 wt. % to 25 wt. %, 10 wt. % to 30 wt. %, 10 wt. % to 35 wt. %, 10 wt. % to 40 wt. %, 10 wt. % to 50 wt. %, 10 wt. % to 60 wt. %, 15 wt. % to 20 wt. %, 15 wt. % to 25 wt. %, 15 wt. % to 30 wt. %, 15 wt. % to 35 wt. %, 15 wt. % to 40 wt. %, 15 wt. % to 50 wt. %, 15 wt. % to 60 wt. %, 20 wt. % to 25 wt. %, 20 wt. % to 30 wt. %, 20 wt. % to 35 wt. %, 20 wt. % to 40 wt. %, 20 wt. % to 50 wt. %, 20 wt. % to 60 wt. %, 25 wt. % to 30 wt. %, 25 wt. % to 35 wt. %, 25 wt. % to 40 wt. %, 25 wt. % to 50 wt. %, 25 wt. % to 60 wt. %, 30 wt. % to 40 wt. %, 30 wt. % to 50 wt. %, 30 wt. % to 60 wt. %, 40 wt. % to 50 wt. %, 40 wt. % to 60 wt. %, and 50 wt. % to 60 wt. %).

In other embodiments, the amount of the filler is of from about 5 vol. % to about 60 vol. % (e.g., from 5 vol. % to 10 vol. %, 5 vol. % to 15 vol. %, 5 vol. % to 20 vol. %, 5 vol. % to 25 vol. %, 5 vol. % to 30 vol. %, 5 vol. % to 35 vol. %, 5 vol. % to 40 vol. %, 5 vol. % to 50 vol. %, 5 vol. % to 60 vol. %, 10 vol. % to 15 vol. %, 10 vol. % to 20 vol. %, 10 vol. % to 25 vol. %, 10 vol. % to 30 vol. %, 10 vol. % to 35 vol. %, 10 vol. % to 40 vol. %, 10 vol. % to 50 vol. %, 10 vol. % to 60 vol. %, 15 vol. % to 20 vol. %, 15 vol. % to 25 vol. %, 15 vol. % to 30 vol. %, 15 vol. % to 35 vol. %, 15 vol. % to 40 vol. %, 15 vol. % to 50 vol. %, 15 vol. % to 60 vol. %, 20 vol. % to 25 vol. %, 20 vol. % to 30 vol. %, 20 vol. % to 35 vol. %, 20 vol. % to 40 vol. %, 20 vol. % to 50 vol. %, 20 vol. % to 60 vol. %, 25 vol. % to 30 vol. %, 25 vol. % to 35 vol. %, 25 vol. % to 40 vol. %, 25 vol. % to 50 vol. %, 25 vol. % to 60 vol. %, 30 vol. % to 40 vol. %, 30 vol. % to 50 vol. %, 30 vol. % to 60 vol. %, 40 vol. % to 50 vol. %, 40 vol. % to 60 vol. %, and 50 vol. % to 60 vol. %).

Methods herein can include thermally treating the mixture, e.g., thereby forming a composite. In some embodiments, the thermally treating step is conducted in the presence of a metal. In further embodiments, the composite forms a seal with the metal. In yet other embodiments, the metal is inserted into the cavity, and the mixture (or composite) is flowed into the cavity, thereby facilitating contact between the metal and the mixture (or composite).

Methods can also include a providing step, e.g., in which the providing step is conducted by providing the mixture within a cavity (e.g., a cavity within a casing). In further embodiments, the thermally treating step includes inserting a metal component (e.g., a metal pin) within the cavity and heating the mixture, thereby allowing the mixture to flow into a space defined by the cavity and the metal component. In yet further embodiments, the cooling steps include forming a seal (e.g., a hermetic seal) between the composite and metal component (e.g., and the casing).

In yet another aspect, the present invention features a hermetic seal (e.g., including any composite or mixture described herein). In one embodiment, the hermetic seal includes a metal component (e.g., any herein); and a composite (e.g., any herein) disposed on a surface of the metal component. In another embodiment, the hermetic seal further includes a casing, where the metal component is disposed within a cavity of the casing and the composite is further disposed on a surface defining the cavity. In yet another embodiment, the casing includes a plurality of cavities, and a metal component is disposed within each cavity. In further embodiments, a hermetic seal is formed within each cavity.

Matrices and Fillers

The present invention relates, in part, to filled glass composites (FGCs). In some instances, such a composite will include a matrix and a filler. In particular embodiments, the matrix includes a glass (e.g., a glass-ceramic), and/or the filler includes a plurality of particles (e.g., any described herein in any useful form, such as a powder form).

Exemplary, non-limiting matrices include a barium aluminosilicate (BAS) glass, a barium aluminoborosilicate (BABS) glass, an S-glass, and a belt-processable S-glass (BPS). Any useful exemplary BAS glasses (e.g., including $BaO—Al_2O_3—SiO_2$ or $SiO_2—BaO—K_2O—Na_2O—Al_2O_3—CaO$ or any described in U.S. Pat. No. 4,615,987); BABS glasses (e.g., including $SiO_2—B_2O_3—Al_2O_3—BaO$ or any described in U.S. Pat. No. 3,998,667); S glasses (e.g., including $Li_2O—SiO_2—Al_2O_3—K_2O—B_2O_3—P_2O_5$ or any described in U.S. Pat. No. 4,414,282); SB glasses (an S glass with a lower boron content); and/or BPS glasses (e.g., having of from about 65 wt. % to about 80 wt. % of $SiO_2$; from about 8 wt. % to about 16 wt. % of $Li_2O$; from about 2 wt. % to about 8 wt. % of $Al_2O_3$; from about 1 wt. % to about 8 wt. % of $K_2O$; from about 1 wt. % to about 5 wt. % of $P_2O_5$; from about 0.5 wt. % to about 7 wt. % of $B_2O_3$; and from about 0.1 wt. % to about 5 wt. % of ZnO or including $Li_2O—SiO_2—Al_2O_3—K_2O—B_2O_3—P_2O_5—ZnO$ or any described in U.S. Pat. No. 5,820,989) may be employed as a matrix. Additional matrices included any material described in U.S. Pat. Nos. 3,998,667, 4,414,282, 4,615,987, and 5,820,989, each of which is incorporated herein by reference in its entirety.

Table 1 shows an exemplary composition, as well as minimum and maximum wt. %, for S, SB, and BPS glasses.

TABLE 1

Exemplary composition of glasses

| Oxide | S glass (wt. %) | | | SB glass (wt. %) | | | BPS glass (wt. %) | | |
|---|---|---|---|---|---|---|---|---|---|
| | Min | Max | Target | Min | Max | Target | Min | Max | Target |
| $SiO_2$ | 65 | 80 | 71.7 | 71.5 | 78 | 74.32 | 65 | 80 | 74.1 |
| $Li_2O$ | 8 | 16 | 12.6 | 11 | 14 | 13.02 | 8 | 16 | 12.7 |
| $Al_2O_3$ | 2 | 8 | 5.1 | 4 | 5 | 4.66 | 2 | 8 | 3.8 |

TABLE 1-continued

Exemplary composition of glasses

| Oxide | S glass (wt. %) | | | SB glass (wt. %) | | | BPS glass (wt. %) | | |
|---|---|---|---|---|---|---|---|---|---|
| | Min | Max | Target | Min | Max | Target | Min | Max | Target |
| $K_2O$ | 1 | 8 | 4.9 | 4 | 5 | 4.04 | 1 | 8 | 2.95 |
| $B_2O_3$ | 1.5 | 7.0 | 3.2 | 1 | 1.5 | 1.38 | 0.5 | 7 | 1.2 |
| $P_2O_5$ | 1 | 5 | 2.5 | 2 | 3 | 2.58 | 1 | 5 | 3.15 |
| ZnO | — | — | — | — | — | — | 0 | 5 | 1.85 |

The composite, matrix, or mixture can be formed from raw materials that are functionally equivalent to the components present in the final composite. For instance, functionally equivalent raw materials include phosphates, carbonates, borates, lithium forms, etc. of any of the components described herein for the composite, matrix, or mixture. In one example, the composite, matrix, or mixture herein includes from about 8 wt. % to about 16 wt. % of $Li_2O$, which can be introduced as a raw material that is a carbonate form of the $Li_2O$ component (e.g., as a $Li_2CO_3$ raw material). Other raw materials include carbonate forms of $K_2O$ (e.g., $K_2CO_3$ raw materials); lithium forms of $P_2O_5$ (e.g., $Li_3PO_4$ raw materials); as well as borate forms of $B_2O_3$ (e.g., $H_3BO_3$ raw materials).

The composite, matrix, or mixture can be any useful composition. In one embodiment, the composite, matrix, or mixture includes a final composition of $SiO_2$ (e.g., 65-80 wt. %), $Li_2O$ (e.g., 8-16 wt. %), $Al_2O_3$ (e.g., 2-8 wt. %), $P_2O_5$ (e.g., 1-5 wt. %), $K_2O$ (e.g., 1-8 wt. %), $B_2O_3$ (e.g., 0.5-7 wt. %), and ZnO (e.g., 0.1-5 wt. %). High-strength seals can also be made using 304 stainless steel as well as nitronic stainless steel in the metal housing or casing and other stainless steel alloys with the disclosed glass-ceramic of the present invention by belt processing. Additional materials are described in U.S. Pat. No. 5,820,989, which is incorporated herein by reference in its entirety.

Any useful filler can be used in any useful form (e.g., powder form, flake forms, and/or spray dried form). Exemplary fillers can be provided as a plurality of particles (e.g., nanoparticles or crystalline particles), crystals, etc., and include the following: a metal (e.g., gold, silver, copper, palladium, platinum, zinc, etc., as well as combinations thereof), an oxide (e.g., silica, zinc oxide, aluminum oxide, etc.), and/or a ceramic (e.g., alumina).

Applications

Composites can be used in numerous applications. For instance, composite-to-metal seals can be useful for electrical connections (e.g., in co-axial single pin or multiple-pin connectors, headers, as described in U.S. Pat. Nos. 4,414,282 and 8,082,663, which is incorporated herein by reference in its entirety). Electrical connectors with hermetic seals are used in aerospace applications, such as communications satellites, microwave communications equip, and military communications and radar systems; the automotive industry; and commercial communications.

Composite-to-metal seals can include any useful metal. Exemplary metals include a conductive metal, stainless steel (e.g., 304L, 330, or 333 stainless steel), nitronic steel, palladium, gold, silver, copper, nickel, titanium, molybdenum, chrome, as well as alloys thereof (e.g., a silver-copper nickel alloy, a nickel-molybdenum chrome alloy (Hastelloy C-276, Inconel 625, or Inconel 718)).

Such metals can be of any useful form, such as a pin, a housing, a casing, etc. In one embodiment, the metal pin is a commercially available pin, referred to as a Paliney® 7 pin, with the approximate composition of 34% Pd, 30% Ag, 10% Pt, 10% Au, 15% Cu, and less than 1% Zn. In another embodiment, the metal pin is a commercially available pin, referred to as a Paliney® 6 pin, with the approximate composition of 43-45% Pd, approximately 37-39% Ag, approximately 0.8-1.2% Pt, approximately 15-17% Cu, and less than or equal to 1.2% Ni. In one embodiment, these pins have a hardness of greater than or equal to 300 Knoop after heat treatment incorporated into the sealing cycle. The metal pin can also be comprised of 330 or 333 stainless steel.

EXAMPLES

Example 1: High Thermal Expansion Glass Composite for Sealing Applications

Crystallizable lithium aluminosilicate glasses have been developed, in which appropriate thermal processing produces a high expansion materials suitable for sealing/joining applications. Without wishing to be limited by mechanism, thermal processing generally converts the amorphous glass into a crystalline phase (e.g., silicate crystals) having a higher thermal expansion. The presence of the crystalline phase provides a material having a high coefficient of thermal expansion (e.g., a CTE of about 14 ppm/° C. or greater).

Composition of the material can be altered to provide enhanced properties. For instance, S glass (Schott 8070) has a CTE of about 14 ppm/° C., and BPS glass (a type of S glass having ZnO, Schott 8073) has a CTE of about 17 ppm/° C. However, BPS glass is a material having a nonlinear thermal strain.

Materials can be processed in any useful manner. For instance, S glass is typically processed using a classical crystallization schedule, which can include the following steps: heating to a peak glass melting temperature, nucleating crystals at a lower intermediate temperature, growing the crystals at a temperature above the nucleation temperature but below the peak melt temperature, and cooling to room temperature. BPS glass is generally processed using a classical belt furnace process, which is simpler than the aforementioned classical crystallization schedule. An exemplary belt furnace process can include the following steps: heating to a peak glass melting temperature, controlled cooling to an intermediate temperature to nucleate and grow crystals, and cooling to room temperature.

Thermal processing can also be adapted to improve thermal expansion properties. Recently, Dai developed a modified process for Schott 8073 (BPS glass) using a classical crystallization schedule to increase the amount of quartz relative to cristobalite in the glass ceramic to achieve a near linear thermal strain (see, e.g., Dai S et al., "Sealing glass-ceramics with near linear thermal strain, part I: process development and phase identification," *J. Am. Ceram. Soc.* 2016; 99(11):3719-25; Rodriguez M A et al., "Sealing glass-ceramics with near-linear thermal strain, part ii: sequence of crystallization and phase stability," *J. Am. Ceram. Soc.* 2016; 99(11):3726-33; and Dai S et al., "Sealing glass-ceramics with near-linear thermal strain, part III: stress modeling of strain and strain rate matched glass-ceramic to metal seals," *J. Am. Ceram. Soc.* 2017, DOI: 10.1111/jace.14821). However, thermal processing can include numerous heating-cooling steps.

Herein, we describe a filled glass composite, in which a filler is intentionally added to a material (e.g., a matrix) to provide a material having a high CTE, while minimizing processing steps. In one non-limiting instance, the composite is formed by adding a crystalline quartz powder (as a filler) to the BPS glass (as a matrix) prior to thermal processing to control the quartz:cristobalite ratio in the final product. Upfront addition of quartz can avoid or minimize use of a more restrictive, classical crystallization process to produce the quartz in situ. Thus, the material can be processed using a simpler, more flexible, and more manufacturable classical belt furnace process. The filler can easily be added to the glass during spray drying, a conventional process used to produce material for pressed powder preform seal materials.

Example 2: Engineered Composite Materials for Next Generation Glass-to-Metal Seals Traditional glasses find numerous uses, including as components capable of sealing to metal surfaces. Steadily increasing demands have pushed critical properties like the strength of traditional glasses in glass-to-metal (GtM) seals to their limits, shrinking and eliminating margins critical to performance and reliability. Glass-ceramics (G-Cs) in GtM seals have improved tolerance to cracking/chipping, but at the expense of robust manufacturability, and with unresolved hermeticity issues attributable to poor interface bonding. Advanced composites including two or more chemically compatible materials could be developed in order to take advantage of the desirable attributes of the constituent materials while circumventing their deficiencies. In particular embodiments, described herein are particle-filled glass composites (FGCs) offer enhanced manufacturability, performance, and reliability by combining the processing robustness and thermodynamic stability of a glass, with the physical stability, design flexibility, and enhanced performance of a G-C or crystalline solid. FGCs also afford more robust processing, and greater control of microstructure and properties compared to G-Cs. Further details on forming and characterizing FGCs are described herein.

Example 3: Composite Design, Properties, and Processing

Composites can be characterized in any useful manner. Experimentally-validated physics-based models currently exist to design and process tailored-property FGCs. (see, e.g., Ewsuk and Harrison "Processes for Manufacturing Tailored Property Ceramic Composites," in Transactions of the American Ceramic Society, ACerS, Westerville, Ohio, 1995; Ewsuk and Harrison, "Densification of Glass-Filled, Alumina Composites," pp. 436-51 in Ceramic Transactions, Vol. 7, ACerS, Westerville, Ohio, 1990; Ewsuk et al., "Sintering Glass-Filled Ceramic Composites; Effects of Glass Properties," pp. 969-77 in Ceramic Transactions, 1, ACerS, Westerville, Ohio, 1988; Ewsuk & Harrison, "Filler Particle Size & Size Distribution Effects on Ceramic-Filled-Glass Composite Sintering," 639-48 Ceramic Transactions, 12, ACerS, Westerville, Ohio, 1990; and Ewsuk, "Sintering Maps for Ceramic-Filled-Glass Composites," pp. 125-35 in Ceramic Transactions, 19, The American Ceramic Society, Westerville, Ohio, 1991).

FGC properties can be reasonably accurately predicted from the properties of the individual constituents and their relative concentrations. For example, FGC average linear CTE can be predicted using the parallel mixing model (see, e.g., Ewsuk and Harrison "Processes for Manufacturing Tailored Property Ceramic Composites," in Transactions of the American Ceramic Society, ACerS, Westerville, Ohio, 1995):

$$CTE_{FGC}=CTE_{glass}V_{glass}+CTE_{filler}V_{filler}, \quad (Eq.\ 1)$$

where $CTE_{FGC}$ is the composite CTE, $CTE_{glass}$ is the glass CTE, $CTE_{filler}$ is the filler CTE, $V_{glass}$ is the volume fraction of the glass, and $V_{filler}$ is the volume fraction of the filler. In any given materials system, FGC CTE can be tuned through the selection of the composite constituent materials (and their base properties) and by varying the volume fraction of filler in the glass.

The viscosity of a FGC can be predicted from the glass viscosity and the volume fraction of filler using Euler's model (see, e.g., Ewsuk and Harrison, "Densification of Glass-Filled, Alumina Composites," pp. 436-51 in Ceramic Transactions, Vol. 7, ACerS, Westerville, Ohio, 1990):

$$\eta_c = \eta\left\{1 + \left(\frac{\kappa\phi}{1-[\phi/\phi_{max}]}\right)\right\}^2, \quad (Eq.\ 2)$$

where $\eta_c$ is the composite viscosity, $\eta$ is the glass viscosity, $\kappa$ is an experimentally determined constant related to hydraulic radius, $\phi$ is the volume fraction of filler particles, and $\phi_{max}$ is the maximum possible filler concentration.

For a given materials system, FGC viscosity can be systematically increased by increasing the volume fraction of filler in the composite. FGC viscosity is also influenced by factors including glass properties, filler particle size, size distribution, $\kappa$, and $\phi_{max}$, of which the last two are materials system dependent empirically-determined constants. The constant $\phi_{max}$ also serves as a FGC design parameter, as it defines the absolute maximum volume fraction of filler (i.e., filler loading) in the composite. Realistically, the practical filler loading in a FGC composite must be lower than the absolute maximum, and viscous sintering model based sintering maps and master sintering curves, considering FGC viscosity can be used to understand, control, and optimize FGC design.

Process modeling and processing aids like FGC sintering maps and master sintering curve theory can also be employed to develop robust sealing processes that also afford process flexibility to, for example, optimize pin hardness, and possibly even heal cracks in glass seals (see, e.g., Ewsuk, "Sintering Maps for Ceramic-Filled-Glass Composites," pp. 125-35 in Ceramic Transactions, 19, The American Ceramic Society, Westerville, Ohio, 1991; and DiAntonio et al., "Characterization and Control of Low Temperature Co-Fire Ceramic (LTCC) Sintering," *Proc. Soc Photo-Optical Instr Engineers (SPIE)*, 5231, 160-164 (2003)).

Example 4: Exemplary FGC Materials and Filler Compositions

The properties of a FGC can be determined by the properties of the constituents and their relative concentrations. As illustrated in FIG. 1, a property such as composite CTE can be tuned by controlling the amount and type of filler. The range over which the CTE can be tuned is determined by the CTE of the matrix on the low side, and the CTE of the filler particles on the high side. Typical commercial BAS sealing glasses have a CTE of about 9 to $10\times10^{-6}/°$ C. (or 9 to 10 ppm/° C.). As such, even with a relatively high about $31\times10^{-6}/°$ C. CTE filler, a high filler loading of 40 vol. % may be required to achieve a composite CTE that is high enough to match a ~17×10$^{-6}$/° C. CTE of stainless steel (SS). A higher glass matrix CTE of ~13× 10$^{-6}$/° C. can be used to achieve a composite CTE to match SS with a reasonable about 25 vol. % filler loading (e.g., for processability and process margin). Considering this design information, lower CTE commercial BAS sealing glass and higher CTE crystallizable lithium aluminosilicate (LAS) glass were evaluated for FGC synthesis and to support experimentally-informed composite property and process model testing and validation.

Figure 2A:
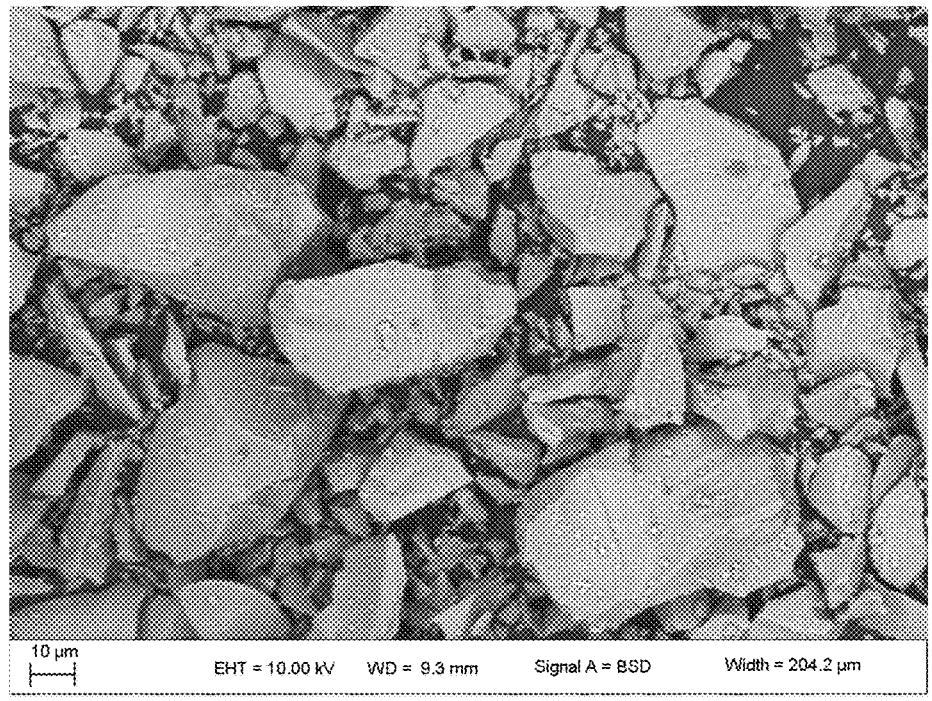
FIG. 2A-2B shows representative scanning electron microscopy (SEM) micrographs of an exemplary BAS glass powder for use as a matrix (FIG. 2A) and an exemplary quartz powder used as a filler to form FGCs (FIG. 2B).

To support the testing and validation of composite property and processing models, several different FGC composites were synthesized and characterized. Two different matrix glasses and four different fillers were used to produce composites containing 7.5 to 30 vol. % filler particles. Tested matrix glasses included barium aluminosilicate (BAS) glasses (two different chemical compositions, of which one composition was tested in either flake or spray dried powder form and the other composition was tested in spray dried powder form) and a BPS glass (in flake form). Prior to composite processing in some instances, flake forms matrix glasses were ground in a steel mortar and pestle to produce finer, nominally <355 m powder. FIG. 2A provides a representative SEM micrograph of an exemplary BAS matrix glass.

Figure 2B:
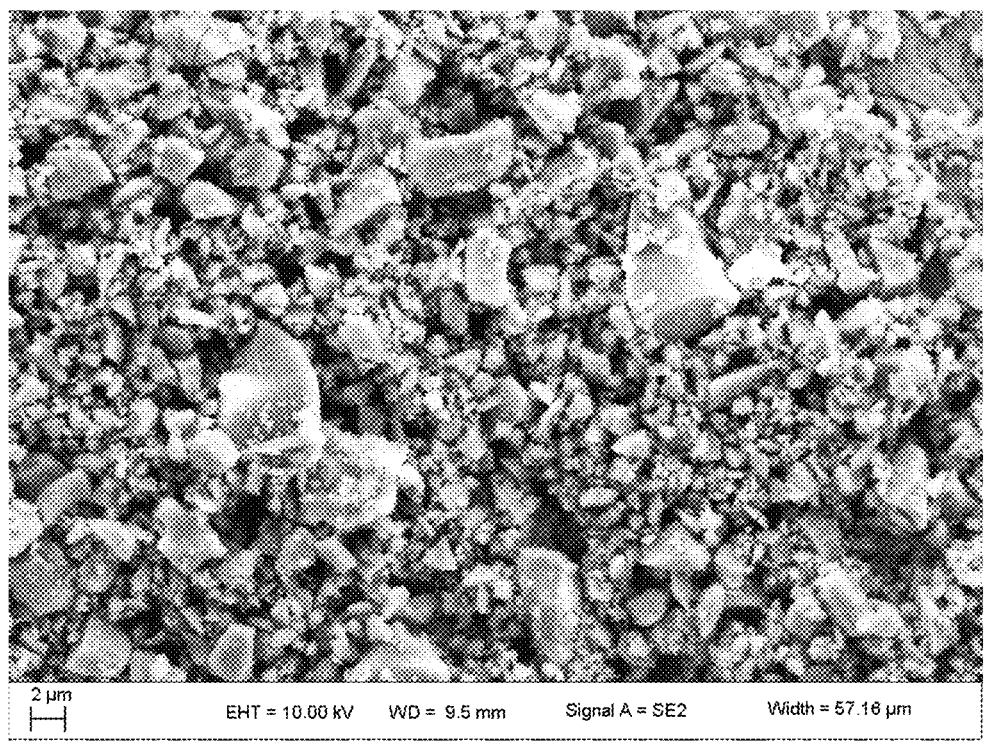

Filler materials included quartz (Min-U-Sil® 5 or 10 quartz, from US Silica, Mill Creek, Okla., USA). A representative SEM micrograph of the quartz powder is shown in FIG. 2B. The milled powder is angular, as expected, and there is a distribution of particle sizes present. The powder does not appear to be agglomerated, which should be good for mixing with the glass to form a FGC. Nominally, the Min-U-Sil® 5 powder is 97%<5 m with a median diameter of 1.5 m. Min-U-Sil® 10 powder is 96%<10 m with a median diameter of 3.68 m. Powder XRD conducted using a PANalytical powder diffractometer with Cu K$\alpha$ radiation (1.5406 Å) and scanning at 0.02°/2 s in the 2$\mu$ range of 10-100° confirmed that the Min-U-Sil® materials are crystalline quartz (versus amorphous $SiO_2$). Other exemplary filler materials included silver (Ag), copper (Cu), and a ceramic (e.g., $Al_2O_3$). In particular, an alumina-filled glass composite was formed and tested (7.5 vol % $Al_2O_3$-filled glass composite). The $Al_2O_3$-filled glass composite was successfully sealed to a 304L SS shell, demonstrating that FGCs are commercially viable sealing materials for GtM seals.

Example 5: Silica-Filled BAS Glass Composites

FGC properties can be predicted from the properties and relative concentrations of the individual constituents. Here, we describe measuring and predicting FGC average linear CTE, which can be predicted using the parallel mixing model. Composite CTE was determined from room temperature (RT) to 300° C. on a nominally 2.5 cm long sample. Prior to measurement, the composite sample was first annealed by heating to ~20-25° C. above the Tg of the BAS matrix glass, followed by slowly cooling at 1° C./min to RT. CTE measurements were made using a Netzsch 402ED dual rod dilatometer. The dilatometer was first calibrated with a Netzsch alumina standard, and the calibration was confirmed by measuring the CTE of a >99.99% platinum standard. FGC CTE was measured by heating in flowing $N_2$ at 1° C./min to slightly above 300° C., followed by cooling at 1° C./min to RT.

Figure 3:
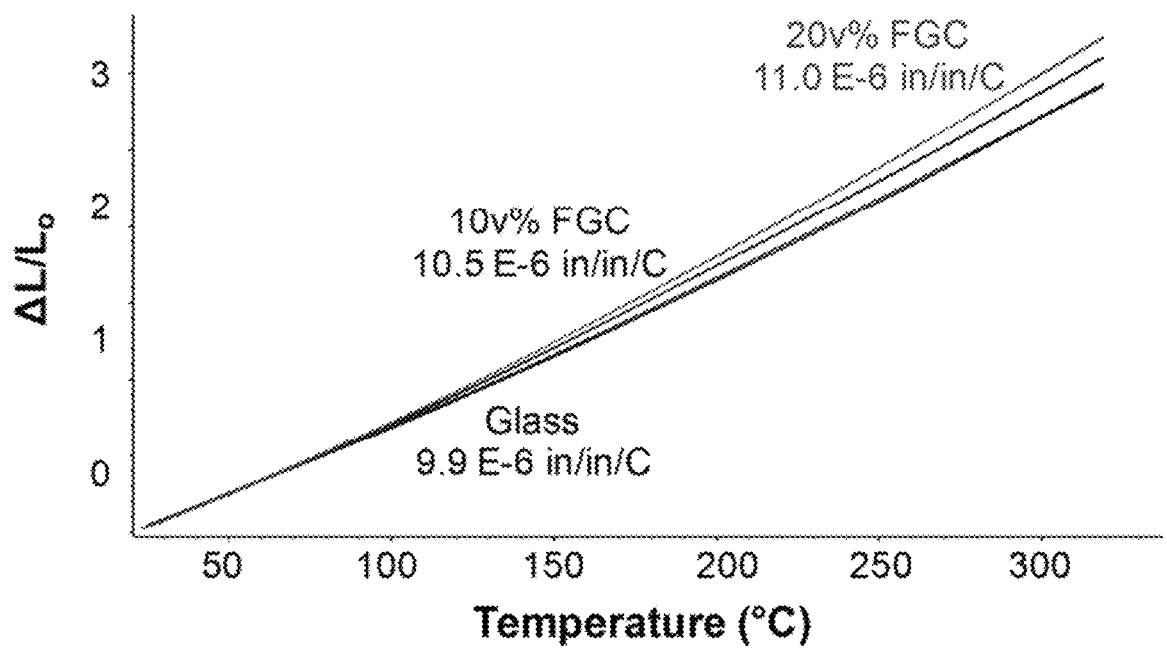
FIG. 3 shows measured thermal strain and average linear CTE of BAS glass (BAS matrix without a filler, "Glass"), 10 vol. % quartz-filled glass composite ("10 v % FGC), and 20 vol. % quartz-filled glass composite ("20 v % FGC").

The measured thermal strain and average linear CTE of the BAS matrix glass and the 10 and 20 vol. % Min-U-Sil® quartz-filled BAS glass composites from 50-300° C. are shown in FIG. 3. As expected, CTE increases with increasing filler loading, as the quartz filler has a higher CTE than the glass matrix. However, the predicted composite CTEs are approximately 40% higher than the measured composite CTEs. It is possible that some of the quartz filler is dissolved by/into the BAS matrix glass, effectively reducing the filler loading in the composites. Reducing the filler loading by 40% results in predictions that match the measured composite CTE's (Table 2). Although not completed in this study, dissolution of the quartz to reduce the effective filler loading could be verified using quantitative stereology techniques to analyze the composite microstructure from SEM micrographs.

TABLE 2

Measured and parallel model predicted CTE of quartz-filled glass composites

| Material | Measured CTE | Predicted CTE |
| --- | --- | --- |
| Glass matrix | 9.9 × 10$^{-6}$/° C. | — |
| 10 vol. % quartz-filled glass composite | 10.4 × 10$^{-6}$/° C. | 10.44 × 10$^{-6}$/° C. |
| 20 vol. % quartz-filled glass composite | 11.0 × 10$^{-6}$/° C. | 10.98 × 10$^{-6}$/° C. |

FGC viscosity can be an important property for process modeling because it determines the processability of the FGC. There is a relationship between sintering and filler loading dependent composite viscosity that can be captured in process maps to understand and control manufacturability. Additionally, for an equivalent filler loading, a lower composite viscosity can be achieved with a coarser size filler particle. The qualitative differences in processing between the Min-U-Sil® 5 and 10 quartz-filled glass composites indicate that FGCs with the larger particle size quartz filler may more processable under some circumstances.

Experiments were completed on 10 vol. % quartz-filled glass composites produced by pressing and sintering. The FGCs were heated side-by-side (SBS) with a solid glass matrix cylinder (without a filler) to a prescribed temperature in a tube furnace at 4.7° C./min in flowing Ar. Experiments were conducted on as-machined and pre-oxidized SS.

Figure 4:
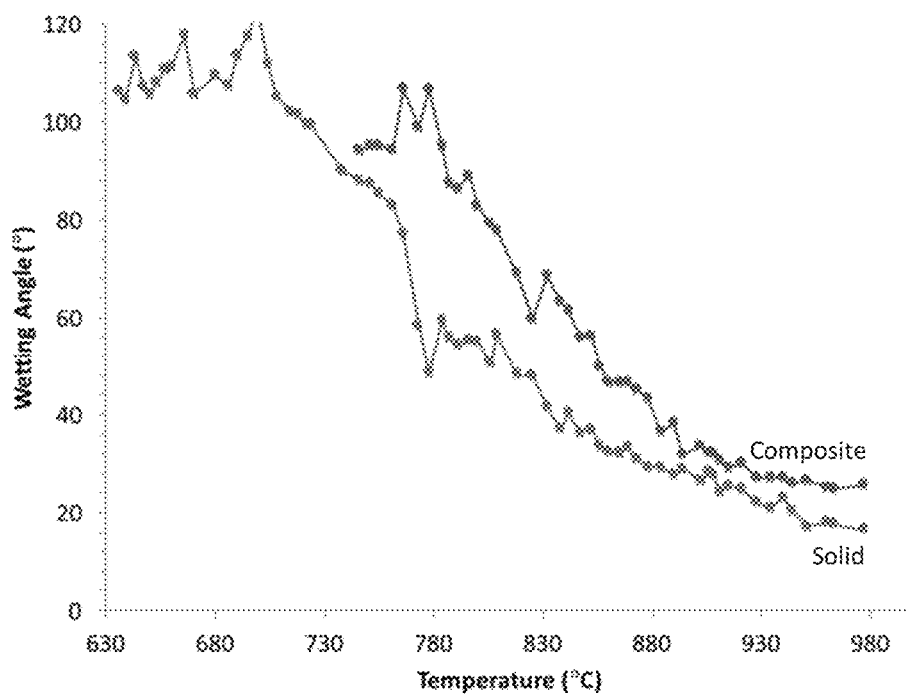
FIG. 4 shows dynamic wetting of a solid BAS glass (BAS matrix without a filler, "Solid") and a sintered pressed powder preform of 10 vol. % quartz-filled glass composite on as-machined 304L stainless steel (SS) ("Composite").
Figure 5:
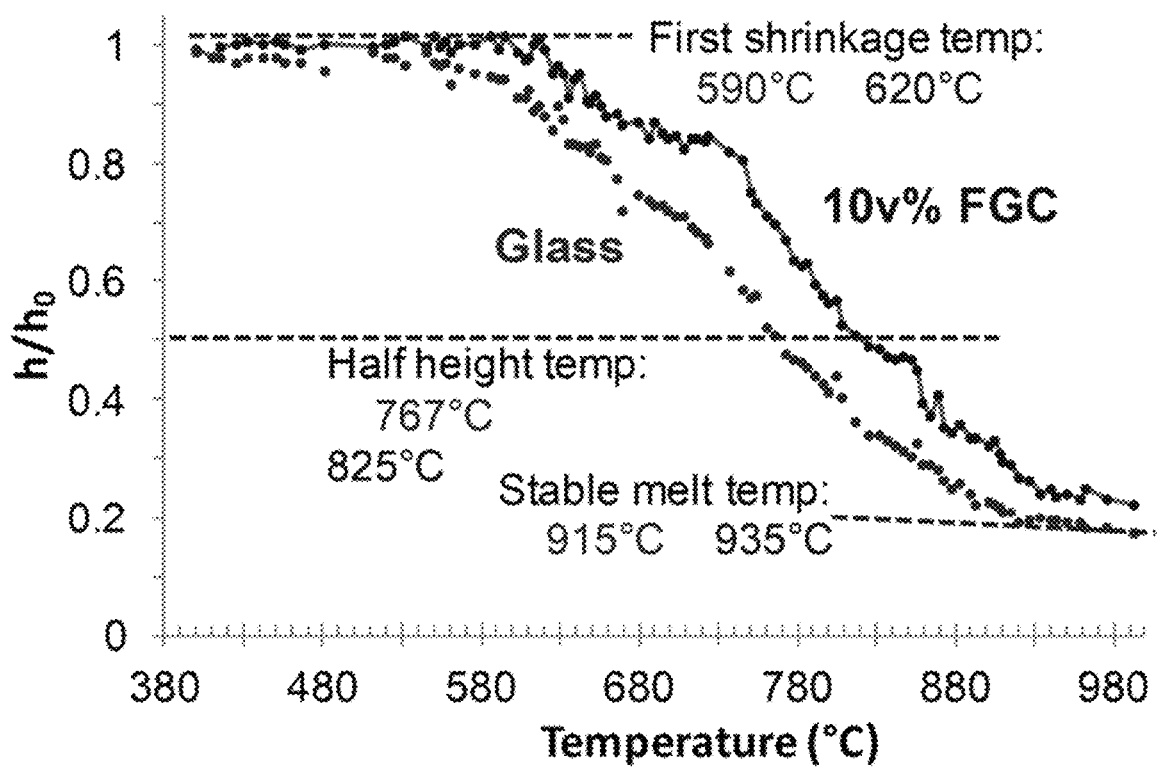
FIG. 5 shows characteristic point analysis of solid BAS glass ("Glass") and a sintered 10 vol. % quartz-filled glass composite on machined 304L SS ("10 v % FGC").
Figure 6:
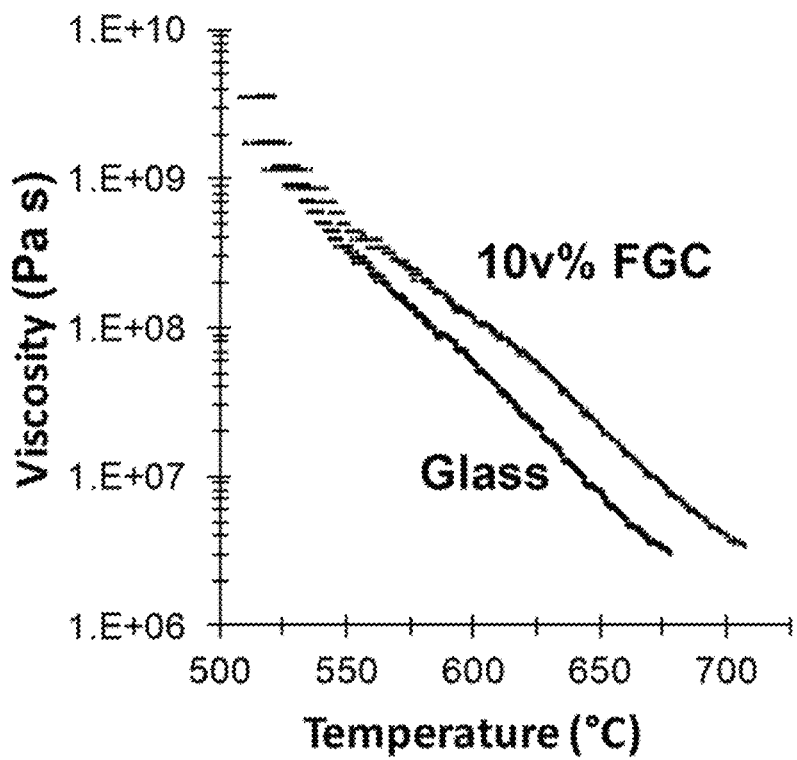
FIG. 6 shows temperature dependent viscosity of BAS glass, and 10 vol. % quartz-filled glass, determined indirectly from characteristic point analysis.

FIG. 4 shows the dynamic wetting of solid glass and 10 vol. % quartz-filled glass on as-machined 304L SS. In general, the solid glass preform deforms and wets the SS faster and more uniformly than the composite. This is further supported by the data from the characteristic point analysis shown in FIG. 5. In general, compared to the FGC, the glass deforms more and has a lower dynamic wetting angle at the same temperature and time throughout the experiment. Additionally, in contrast to glass wetting, which is fairly uniform and consistent, the wetting angle of the composite can vary depending on where the measurement is taken. All this suggests, as expected from the Euler model, that the FGC viscosity in the viscous flow regime is higher relative to the glass at any equivalent temperature and time. The viscosity results in FIG. 6 determined from the characteristic point analysis clearly show that the FGC viscosity is, in fact, higher than the glass viscosity at any equivalent temperature (and time) in the viscous flow range.

Example 6: Silica-Filled BPS Glass Composites

To produce tunable CTE composites with higher CTE, a higher CTE matrix phase is required. While there are claims in the patent literature of ZnO containing glasses with CTEs upwards to 15×10⁶/° C., typical glass CTE's are generally much lower. Higher CTE G-Cs are produced with lithium aluminosilicate (LAS) crystallizable glasses such as Schott 8073, also known as belt processable S (BPS) glass. G-Cs have the potential to be a higher CTE matrix that can also be filled with high CTE filler (e.g., quartz) to produce a high CTE filled glass-ceramic composite (FG-CC). The addition of filler particles to the crystallizable glass also offers significant potential advantages with respect to improved microstructure and property control, enhance process robustness, and lower reactivity with SS.

Figure 7:
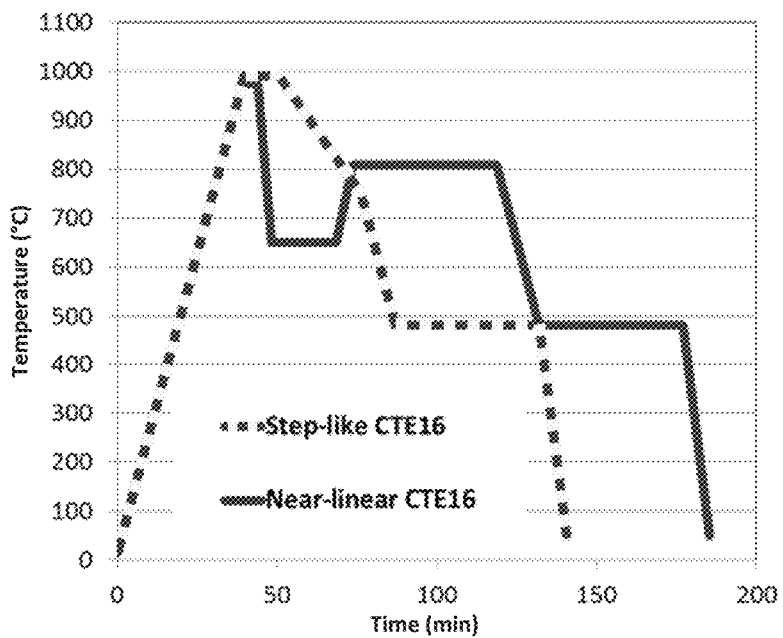
FIG. 7 shows a comparison of the complex, more traditional ceraming thermal profile ("Near-linear CTE 16") and the simpler BPS ceraming profile ("Step-like CTE 16").

In addition to providing the potential of reduced reactivity and a more controlled and more homogeneous microstructure, a quartz-filled crystallizable BPS glass composite can offer the potential of improved properties, and a less process sensitive materials system for more robust manufacturing. Dai et al. have shown that a more linear CTE G-C can be produced by controlling the thermal profile to increase the amount of crystalline quartz in the G-C relative to crystalline cristobalite (see, e.g., Dai S et al., *J. Am. Ceram. Soc.* 2016; 99(11):3719-25; Rodriguez M A et al., *J. Am. Ceram. Soc.* 2016; 99(11):3726-33; and Dai S et al., *J. Am. Ceram. Soc.* 2017, DOI: 10.1111/jace.14821). Unfortunately, a more complex, more traditional ceraming profile was required, involving glass flow/sealing at a high temperature, followed by holds at a low and then an intermediate temperature to favor more quartz crystallization to produce the desired microstructure (FIG. 7, profile labeled "Near-linear CTE"). By comparison, the simpler BPS ceraming process involves fewer steps, and involves only decreases in temperature with time after sealing (i.e., as opposed to cycling between heating and cooling steps). By adding crystalline quartz to the Schott 8073 glass prior to sealing and ceraming, it is possible to produce a G-C with a higher quartz content relative to cristobalite while still using the simpler BPS profile (FIG. 7, profile labeled "Step-like CTE"). Additionally, because the $SiO_2$ in the glass is not required or used up in producing the crystalline quartz, the competition for the $SiO_2$ in the glass is eliminated during processing, resulting in enhanced microstructure control in a much less sensitive process.

Quartz-filled G-C composites were fabricated by adding quartz powder particles to Schott 8073 crystallizable glass and thermally treating. BPS glass flake was first ground into a coarse powder with a steel mortar and pestle, and then the appropriate amounts of Schott 8073 (BPS) glass and Min-U-Sil® 10 quartz powder were weighed out and combined. The powder was ground in a porcelain mortar and pestle to further reduce the size of the glass to less than ~800 m, and to mix the two powders together.

Table 3 provides a comparison of the crystalline quartz and cristobalite contents in near-linear CTE 16 (NL16) and the step-like CTE 16 (SL16) G-Cs produced using the modified more complex ceraming and simpler traditional BPS process, respectively. Table 3 also shows the higher concentration of quartz in the G-C structure that produces a near-linear CTE 16 (NL16) G-C, compared to the lower quartz content produced with the standard BPS profile that produces a step-like CTE 16 (SL16) G-C.

TABLE 3

Comparison of near-linear CTE 16 (NL16) and the step-like CTE 16 (SL16) G-Cs

| Phase | SL16 wt % | SL16 ±wt % | NL16 wt % | NL16 ±wt % |
|---|---|---|---|---|
| Quartz (Low $SiO_2$) | 2.51 | 0.081 | 13.71 | 0.190 |
| Cristobalite $SiO_2$ | 24.37 | 0.325 | 16.55 | 0.257 |
| $Li_2SiO_3$ | 36.82 | 0.480 | 37.95 | 0.422 |
| $Li_3PO_4$ | 7.94 | 0.467 | 7.36 | 0.434 |
| Amorphous | 28.36 | 0.586 | 24.42 | 0.581 |

Using a density of 2.33 g/cc for cristobalite (CR), and a density of 2.65 g/cc for quartz (QZ), the CR/QZ volume ratio is ~3/2 for the NL16 G-C, compared to a significantly higher ~11/1 for SL16 G-C. Based on an estimate of the amount of quartz that is produced with the standard BPS process, additional quartz powder was added to the Schott 8073 glass prior to ceraming to increase the total quartz content in the FG-CC using the standard BPS sealing process. This base composition is designated as the center line (CL) composition in this study, and higher and lower quartz additions in increments of 0.25 g were fabricated for study about the CL. The composites evaluated are summarized in Table 4.

TABLE 4

Summary of quartz-filled BPS G-C composite formulations

| Sample Designation | BPS Glass Powder (g) | Min-U-Sil ® 10 Quartz Powder (g) | Initial Wt % Quartz |
|---|---|---|---|
| BPS | 10.00 | 0.00 | 0.0 |
| BPS-CL – 1 | 8.75 | 1.25 | 12.5 |
| BPS-CL | 8.50 | 1.50 | 15.0 |
| BPS-CL + 1 | 8.25 | 1.75 | 17.5 |
| BPS-CL + 2 | 8.00 | 2.00 | 20.0 |
| BPS CL + 5.5 | 5.04 | 2.00 | 28.4 |

Figure 8A:
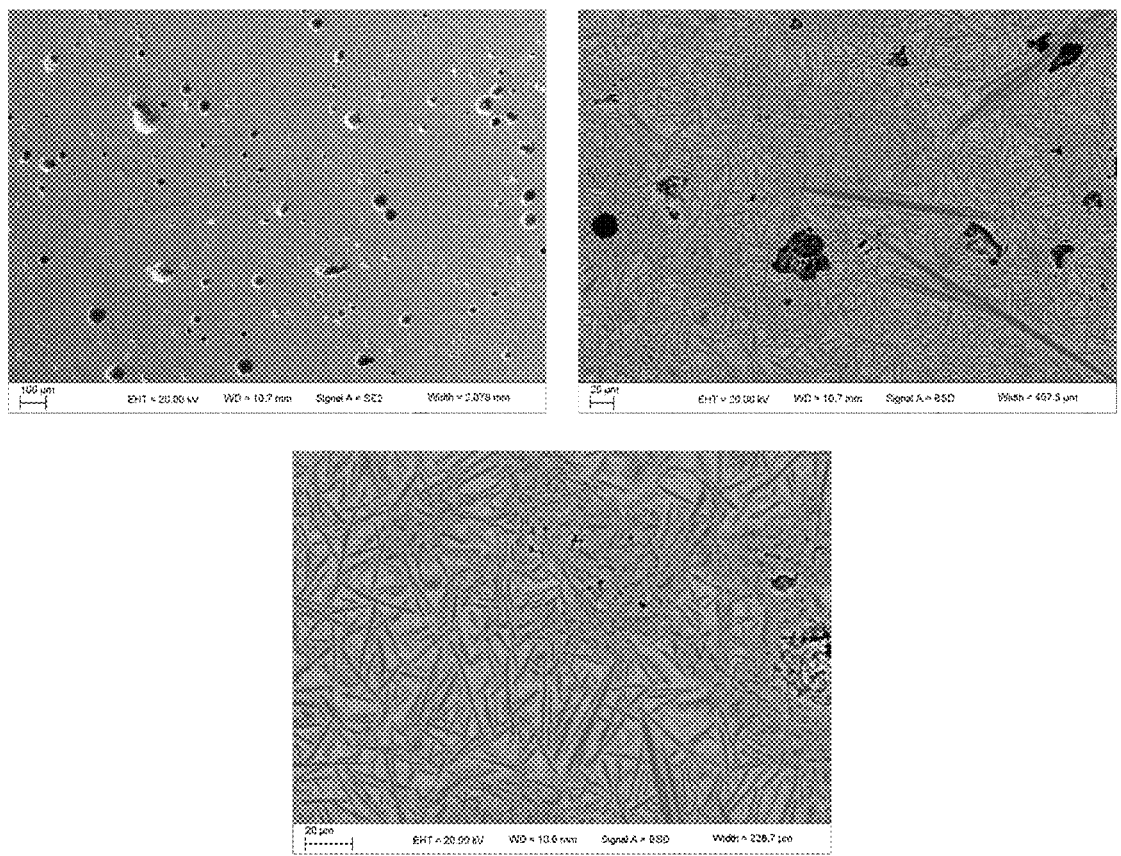
FIG. 8A-8B shows representative SEM micrograph of ceramed BPS CL FG-CC (FIG. 8A) and of ceramed BPS CL+1 FG-GC (FIG. 8B).
Figure 8B:
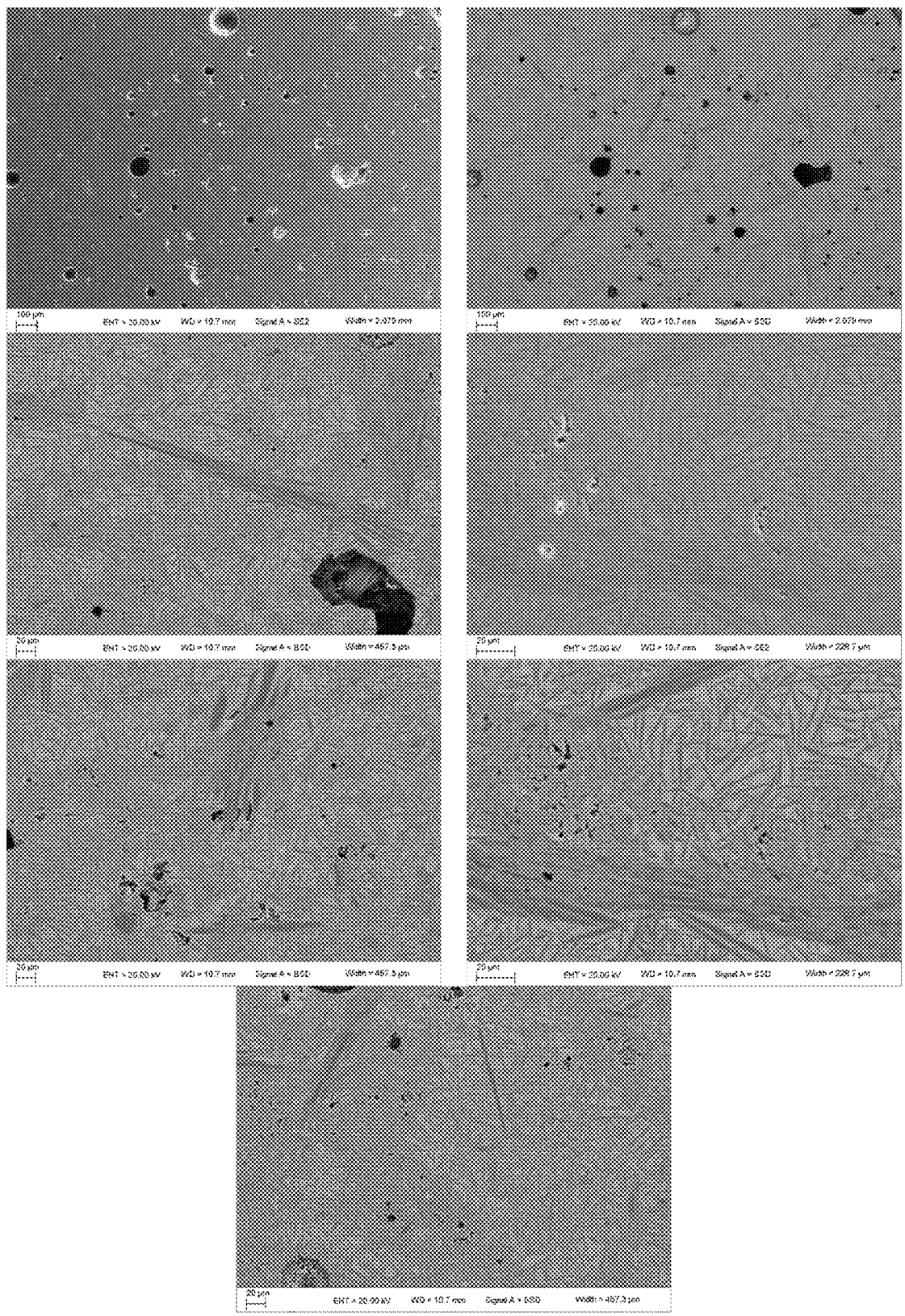
Figure 9A:
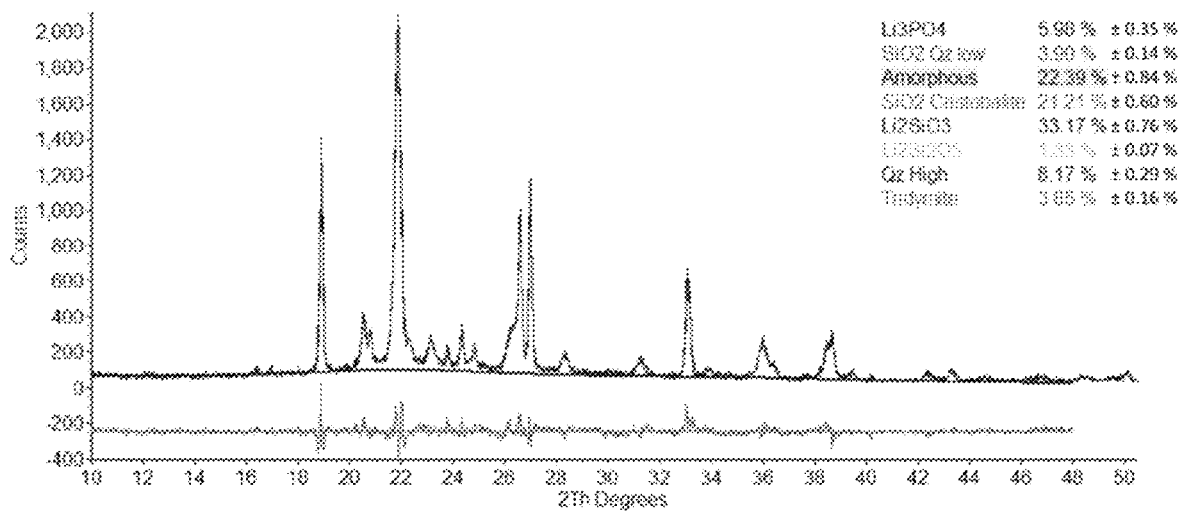
FIG. 9A-9C shows TOPAS quantitative phase content analysis of BPS CL FG-CC heat-treated using CTE 15.8 profile B (FIG. 9A), of BPS CL+1 FG-CC heat-treated using CTE 15.8 profile B (FIG. 9B), and of BPS CL+5.5 heat-treated using CTE 15.8 profile B (FIG. 9C).
Figure 9B:
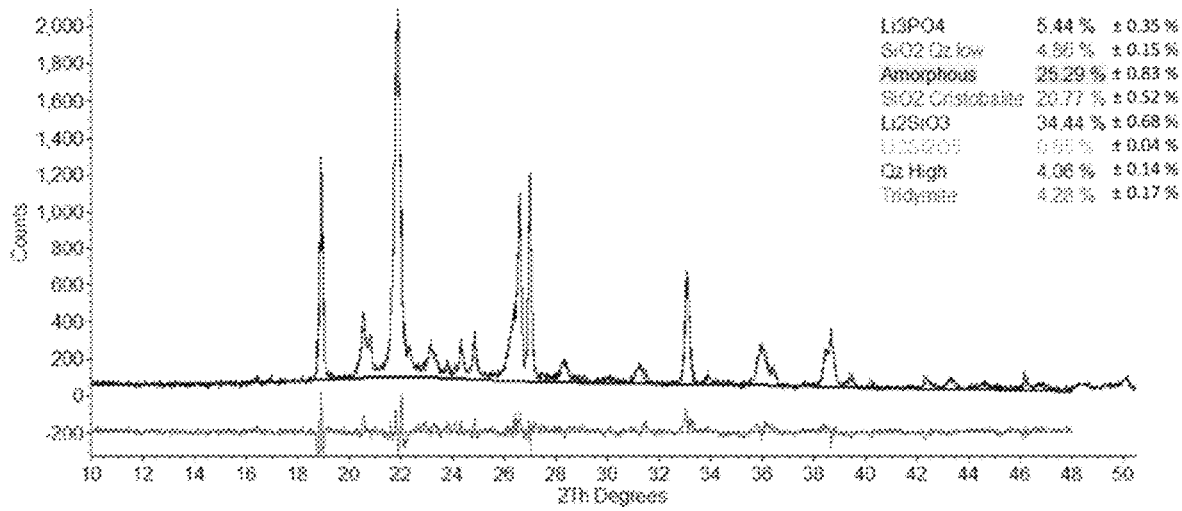
Figure 9C:
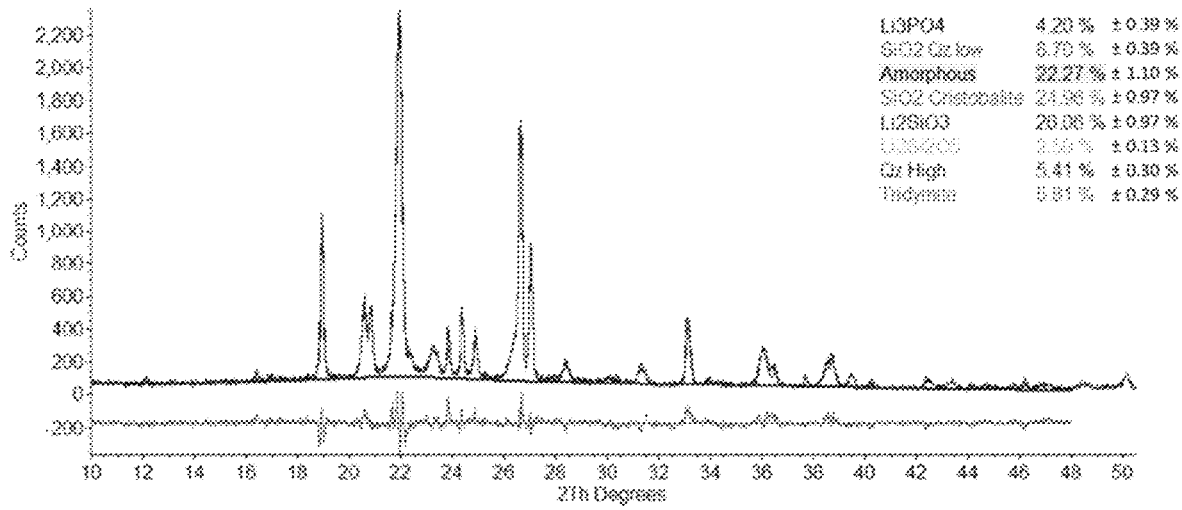

Composites were characterized using SEM and quantitative XRD. Representative SEM micrographs show the characteristic microstructure of the baseline BPS CL FG-CC (FIG. 8A) and of the BPS CL+1 FG-CC (FIG. 8B). The results for BPS CL+1 FG-CC are generally similar to the BPS CL FG-CC results, with the exception that the microstructure appears even more heterogeneous. The BPS-CL and BPS-CL+1 CTE test bars were ground to a powder less than 74 m in size using a porcelain mortal with pestle. The ground material (~1 gram of each) was submitted for XRD analysis. The background was fit using a Chebyshev 1st order polynomial function. To estimate the amorphous phase fraction, an additional phase of $SiO_2$ was added using the structure of cristobalite but with a crystallite size set to 9 Angstroms. To first order, this highly nanocrystalline cristobalite phase accounted for the amorphous intensity, which in turn correlated to the weight faction of the glass present. This is only a weight fraction estimate as we assume that the density of the nanocrystalline cristobalite phase is similar in value to that of glass phase present. Subsequently, quantitative analysis via Rietveld refinement including determining the amorphous content of the BPS CL+5.5 sample was performed. The newest refinement procedure showed an improvement in the quality of the fit, so the refinements for BPS CL and BPS CL+1 were redone using the same protocol so as to obtain consistent results. This change in protocol resulted in some changes to the wt % values obtained originally. The XRD results and quantitative analysis for the BPS CL, BPS CL+1, and BPS CL+5.5 samples are shown in FIGS. 9A-9C, respectively.

Compared to the reference NL16 G-C, the FG-CC samples contain additional silicate crystalline phases, including high quartz and tridymite. As such, to calculate the wt % CR/QZ ratio, the high and low quartz contents were summed. The results summarized in Table 5 show that, in comparison to SL16 G-C, the wt % CR/QZ ratio decreases with the addition of quartz powder to the BPS glass, as anticipated. However, there are no clear trends with increasing wt % quartz powder additions from CL to CL+1 to CL+5.5.

TABLE 5

XRD measured wt % quartz and calculated CR/QZ ratios

| FG-CC Sample | Low Quartz (wt %) | High Quartz (wt %) | Total Quartz (wt %) | CR/QZ (CR/QZ + TR) | Tridymite (wt %) |
|---|---|---|---|---|---|
| BPS CL | 3.90 | 8.17 | 12.07 | 1.84 (1.33) | 3.85 |
| BPS CL + 1 | 4.86 | 4.06 | 8.92 | 2.32 (1.57) | 4.28 |
| BPS CL + 5.5 | 8.70 | 5.41 | 14.11 | 1.76 (1.25) | 5.81 |

In preparation for measuring FG-CC CTE, the ceramed CTE test bars were cut to produce a ~2.5 cm long sample. FG-CC CTE was measured using a Netzsch 402C single rod dilatometer. Prior to testing, the FG-CC was annealed by heating at 1° C./min to slightly above 600° C., followed by cooling at 1° C./min to RT. Ultimately, the 40-600° C. and 80-600° C. CTE and coefficient of thermal contraction (CTC) were determined using the previously described standard dilatometer analysis procedure. For reference, the CTEs of Elan-46 samples ceramed using the standard production CTE 15.8 profile B and 16.8 profile A were also characterized.

The CTE results are summarized in Table 6. Based on a back of the envelope calculation, a CTE of $17 \times 10^{-6}/°$ C. was predicted for the nominally 17.5 vol. % quartz FG-CC (BPS CL+1), which is in good agreement with the $17 \times 10^{-6}/°$ C. measured value. The FG-CC CTE is $\sim 1 \times 10^{-6}/°$ C. higher than the expected $15.8 \times 10^{-6}/°$ C. CTE, and the CTE of the reference Elan 46 G-C processed using the same thermal profile. The FG-CC CTE is clearly higher than the G-C CTE for the same ceraming profile, and the highest quartz filler loading produces the highest FG-CC CTE. The results indicate that CTE can be tuned by controlling the quartz filler loading, and higher CTE sealing materials are possible with quartz-filled G-C composites compared to the G-C alone.

Figure 10:
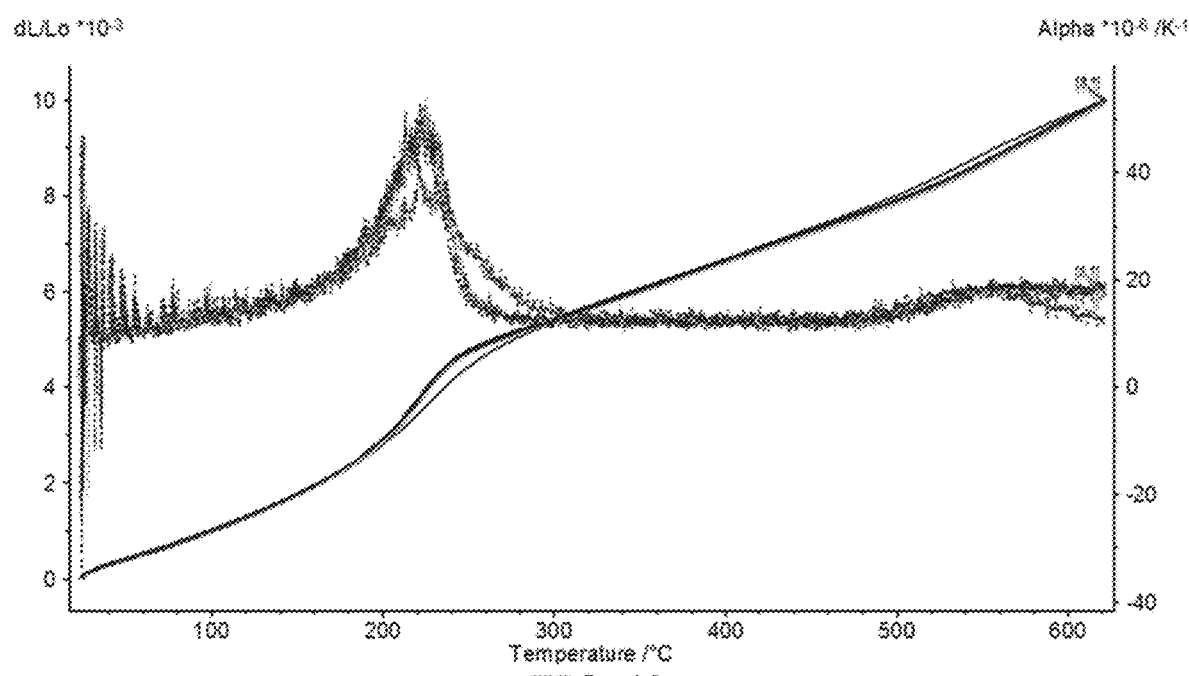
FIG. 10 shows thermal strain and 1st derivative of measured thermal strain of the BPS CL+1 FG-CC (red) and a reference Elan 46 G-C (purple, pink, brown, green) heat-treated using the same CTE 15.8 profile B.

While the FG-CC design and processing are not yet fully optimized, these results presented in FIG. 10 clearly show that the quartz addition modifies the material thermal strain. In particular, compared to the reference Elan 46 G-C, the peak in the first derivative of the thermal strain (red curve) of the quartz-filled G-C composite is clearly smaller for the FG-CC, and the thermal strain is clearly more linear.

Overall, crystallizable lithium aluminosilicate glasses have been developed that, after appropriate thermal processing, produce a high CTE material suitable for hermetic sealing/joining applications. In particular embodiments, a filler (e.g., a crystalline quartz powder) was added to a glass matrix (e.g., prior to thermal processing) to control the quartz:crystobalite ratio in the final crystallized G-C product. In some instances, the exogenous addition of filler particles to a matrix (through a particle filled composite approach) results in enhanced manufacturability of the G-C using a simpler, more flexible classical belt furnace process with greater process control. In turn, manufacturing sensitivity decreases (i.e., manufacturing is less sensitivity to the starting glass and/or the preform processing of that glass prior to sealing), and there is improved control over the final G-C microstructure and properties (e.g., the composite properties are more tunable), in which higher CTEs are achievable.

Production of this new, particle-filled composite may require a change to the more typical process of glass powder processing. Fortunately, so existing powder processing and process understanding can be employed to these new composites. In particular embodiments, the filler can easily be added to the matrix during mixing/milling and spray drying, and conventional processes may be used to produce material for preforms.

Example 7: FGC Preforms for Use in Hermetic Seals

The filled-glass composites (FGCs) herein can be employed in any useful purpose. In one use, the FGC is formed into a preform, which is then inserted into a cavity in which a hermetic seal is to be formed. Then, the preform is heated to a sealing temperature (e.g., a temperature $T_1$) and then processed according to any thermal process that produced a FGC having enhanced thermal properties (e.g., an enhanced CTE). This example provides non-limiting embodiments of preforms and their use.

The FGC herein is particular useful for forming hermetic seals to metals (e.g., stainless steel, as well as other metals described herein). The formation of FGC seals can be tested

TABLE 6

Summary of the measured FG-CC and reference G-C CTEs

Figure 11A:
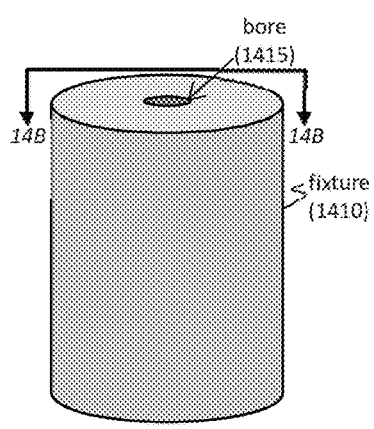
FIG. 11A-11B shows a schematic of an exemplary fixture 1410 (FIG. 11A) an exemplary FGC seal between a FGC 1425 and a pin 1420 (FIG. 11B).
Figure 11B:
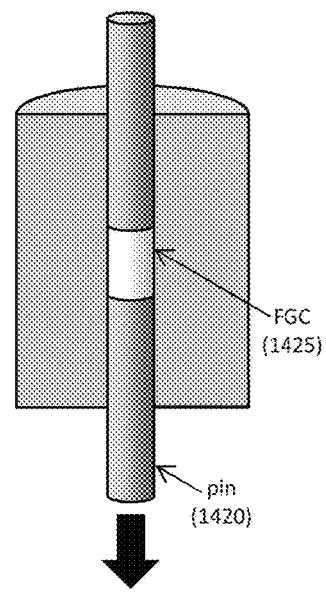

| | Heat | | Cool | |
|---|---|---|---|---|
| Sample ID | 40° C.-600° C. | 80° C.-600° C. | 40° C.-600° C. | 80° C.-600° C. |
| BPS CTE 15.8, from flake, sample 1 | 15.51 E−06 | 15.88 E−06 | 16.07 E−06 | 16.47 E−06 |
| BPS CTE 15.8, from flake, sample 2 | 16.19 E−06 | 16.59 E−06 | 16.43 E−06 | 16.81 E−06 |
| BPS CL, sample 1, profile B, 15.8 | 16.87 E−06 | 17.30 E−06 | 16.76 E−06 | 17.18 E−06 |
| BPS CL, sample 2, profile B, 15.8 | 16.08 E−06 | 16.46 E−06 | 16.31 E−06 | 16.75 E−06 |
| BPS CL + 1, sample 1, profile B, 15.8 | 16.80 E−06 | 17.25 E−06 | 16.96 E−06 | 17.40 E−06 |
| BPS CL + 1, sample 2, profile B, 15.8 | 16.25 E−06 | 16.68 E−06 | 16.51 E−06 | 16.92 E−06 |
| BPS CL + 5.5, sample 1, profile B, 15.8 | 17.46 E−06 | 17.90 E−06 | 17.48 E−06 | 17.94 E−06 |
| BPS CL + 5.5, sample 2, profile B, 15.8 | 17.32 E−06 | 17.94 E−06 | 17.81 E−06 | 18.30 E−06 |
| Elan-46, CTE 15.8 | 15.69 E−06 | 16.08 E−06 | 16.00 E−06 | 16.38 E−06 |
| Elan-46, CTE 16.8 | 16.55 E−06 | 16.97 E−06 | 16.66 E−06 | 17.08 E−06 | in any useful manner. For instance, FIG. 11A-11B provides a schematic for a fixture 1410 including a bore 1415 through which a metal pin 1420 and a FGC preform can be inserted. A seal can be formed between two metal pins 1420 and the FGC material 1425, and the strength of this seal can be tested by pulling on the pin (black downward arrow in FIG. 11B).

Figures 12A, 12B:
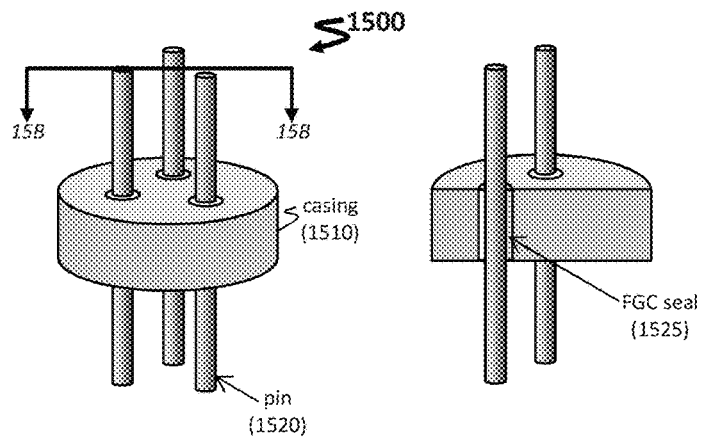
FIG. 12A-12B shows schematics of a connector 1500 having an exemplary FGC seal 1525 between a casing 1510 and a plurality of pins 1520 in a perspective view (FIG. 12A) and a cross-sectional view (FIG. 12B).

In one embodiment, the FGC-to-metal seal includes a hermetic seal with a plurality of pins. As seen in FIG. 12A, the connector 1500 includes a plurality of pins 1520 (e.g., metal pins) disposed within a casing 1510 (e.g., a metal casing). A hermetic FGC seal 1525 is formed between each pin and a cavity within the casing (FIG. 12B). The FGC seal can include any useful FGC composition described herein.

Figures 13A, 13B:
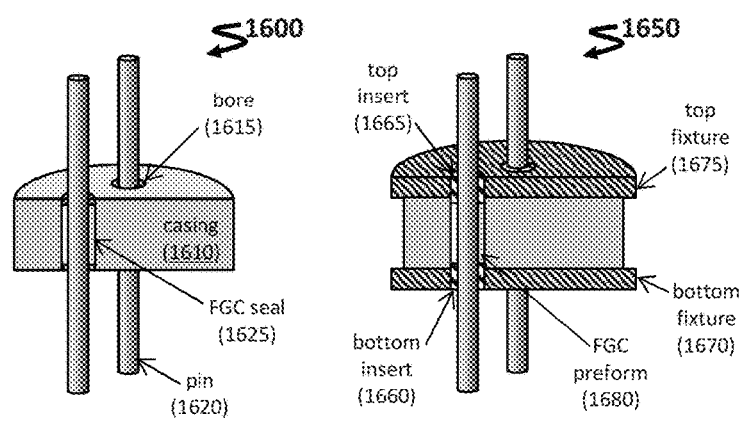
FIG. 13A-13B shows schematics of another exemplary connector 1600 having an exemplary FGC seal 1625 between a casing 1610 and a plurality of pins 1620 (FIG. 13A) and an exemplary assembly 1650 to facilitate seal formation (FIG. 13B).

The FGC composition can extend along the entire bore of the casing or within only a portion of the bore. As seen in FIG. 13A, the connector 1600 includes a plurality of pins 1620 (e.g., metal pins) disposed within a casing 1610 (e.g., a metal casing), in which a FGC seal 1625 is provided within each bore 1615.

The connector can be formed in any useful way. Generally, a solid FGC preform is placed within a cavity or bore requiring the FGC seal. Then, the preform is treated to a high temperature sufficient to melt the preform, such that the melted FGC composition fills the cavity and forms a hermetic seal. During this melting step, the flow of the FGC composition should be controlled (e.g., by employing fixtures and/or inserts). Finally, thermal processes are conducted to crystallize particular polymorphs and solidify the seal.

For instance, as seen in FIG. 13B, an assembly 1650 can be employed to control the melting and sealing process. The solid FGC preform 1680 is placed within each bore of the casing 1610 in which a seal is desired. To ensure that the FGC composition remains within the bore during the melting step (or sealing step at temperature $T_1$, as employed herein, e.g., of from about 900° C. to about 1050° C.), a top insert 1665 and a bottom insert 1660 is placed on each end of the bore. The assembly 1650 also includes a top fixture 1675 located on a top surface of the casing 1610, as well as a bottom fixture 1670 located on a bottom surface of the casing 1610. Each of these fixtures includes recesses that align with each pin 1620 and insert 1660,1665. After sealing, the fixtures and inserts can be removed to provide the connector 1600.

Figure 14:
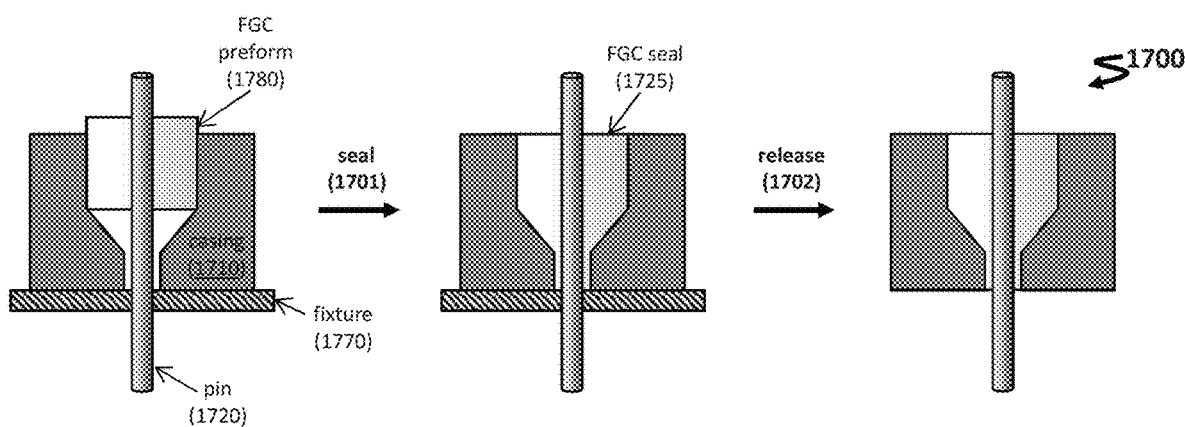
FIG. 14 shows a schematic for an exemplary method of forming a connector 1700.

In another embodiment, the FGC seal is formed by employing a molded casing. As seen in FIG. 14, the casing 1710 includes a molded cavity into which a FGC preform 1780 is placed. The casing also allows for placement and alignment of a pin 1720. To ensure that the FGC composition remains within the molded cavity, a fixture 1770 can be employed. Then, sealing 1701 occurs by heating the assembly to a first temperature $T_1$ sufficient to melt the GC preform. After a thermal treatment schedule, the assembly is released 1702 to form the connector 1700.

Any useful connector can be employed. In one instance, the connector can be an electrical header. FIG. 15A-15B shows an exemplary assembly 1850 to form an electrical header 1800. The assembly 1850 includes a hair pin 1820 disposed within a cavity of the header casing 1810 and inserted through bores 1815 located within the cavity. In addition, a removable fixture 1870 with aligned recesses 1875 are employed during sealing, and inserts 1860 are placed within the bores 1815 to maintain the FGC composition within the bores. The FGC preform 1880 is placed within the cavity of the header casing 1810, and the two preforms sandwich the U-shaped portion of the hair pin 1820.

The FGC seal 1825 is formed (e.g., using any thermal treatment described herein), and then the fixture 1870 and inserts 1860 are removed from the assembly. In addition, the hair pin 1820 is ground to form two pins 1825 that are properly spaced and sealed within the header 1800. Additional inspecting and testing steps, as well as electropolishing and cleaning steps, can be performed on the final header.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A filled glass composite comprising:
    from about 70 wt. % to about 90 wt. % of $SiO_2$;
    from about 3 wt. % to about 14 wt. % of $Li_2O$;
    from about 0.8 wt. % to about 7 wt. % of $Al_2O_3$;
    from about 0.4 wt. % to about 7 wt. % of $K_2O$;
    from about 0.4 wt. % to about 5 wt. % of $P_2O_5$;
    from about 0.2 wt. % to about 7 wt. % of $B_2O_3$; and
    from about 0.1 wt. % to about 5 wt. % of ZnO;
    wherein the composition further comprises of from about 2 wt. % to about 10 wt. % of the $SiO_2$ as a high quartz phase and about 2 wt. % to about 10 wt. % of the $SiO_2$ as a tridymite phase.

2. The composite of claim 1, comprising:
    from about 70 wt. % to about 90 wt. % of $SiO_2$;
    from about 3 wt. % to about 10 wt. % of $Li_2O$;
    from about 0.8 wt. % to about 6 wt. % of $Al_2O_3$;
    from about 0.4 wt. % to about 6 wt. % of $K_2O$;
    from about 0.4 wt. % to about 4 wt. % of $P_2O_5$;
    from about 0.2 wt. % to about 5 wt. % of $B_2O_3$; and
    from about 0.1 wt. % to about 4 wt. % of ZnO.

3. The composite of claim 2, comprising:
    from about 80 wt. % to about 90 wt. % of $SiO_2$;
    from about 5 wt. % to about 10 wt. % of $Li_2O$;
    from about 1.5 wt. % to about 3 wt. % of $Al_2O_3$;
    from about 1 wt. % to about 2 wt. % of $K_2O$;
    from about 1 wt. % to about 2 wt. % of $P_2O_5$;
    from about 0.5 wt. % to about 1 wt. % of $B_2O_3$; and
    from about 0.1 wt. % to about 2 wt. % of ZnO.

4. The composite of claim 1, further comprising of from about 10 wt. % to about 35 wt. % of the $SiO_2$ as a cristobalite phase and/or of from about 3 wt. % to about 10 wt. % of the $SiO_2$ as a low quartz phase.

5. The composite of claim 1, wherein a crystalline phase of the composite comprises of from about 0.5 wt % to about 5 wt. % in a $Li_2Si_2O_5$ form.

6. The composite of claim 1, further comprising a coefficient of thermal expansion of from about 16 ppm/° C. to about 18 ppm/° C.

7. The composite of claim 1, wherein the composite is provided as a glass-ceramic preform or a glass-ceramic seal.

* * * * *